United States Patent
Hasegawa et al.

(10) Patent No.: US 7,768,614 B2
(45) Date of Patent: Aug. 3, 2010

(54) LIQUID CRYSTAL DISPLAY DEVICE HAVING PARTICULAR ELECTRODES IN TRANSMISSION REGION AND IN REFLECTION REGION

(75) Inventors: Atsushi Hasegawa, Togane (JP); Toshio Miyazawa, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 0 days.

(21) Appl. No.: 12/465,748

(22) Filed: May 14, 2009

(65) Prior Publication Data

US 2009/0225261 A1 Sep. 10, 2009

Related U.S. Application Data

(62) Division of application No. 11/255,107, filed on Oct. 21, 2005, now Pat. No. 7,538,845.

(30) Foreign Application Priority Data

Oct. 29, 2004 (JP) ............................. 2004-316250

(51) Int. Cl.
G02F 1/1343 (2006.01)
G02F 1/1335 (2006.01)
(52) U.S. Cl. ..................... 349/141; 349/114; 349/146
(58) Field of Classification Search ................. 349/141, 349/113–115, 143–149
See application file for complete search history.

(56) References Cited

U.S. PATENT DOCUMENTS

| 5,561,440 | A | 10/1996 | Kitajima et al. |
| 6,657,688 | B2 | 12/2003 | Nagata et al. |
| 6,876,420 | B2 | 4/2005 | Hong |
| 6,914,656 | B2 | 7/2005 | Sakamoto |
| 7,239,365 | B2 | 7/2007 | Chang |
| 7,414,682 | B2 | 8/2008 | Shiota |
| 7,420,640 | B2 | 9/2008 | Chae |
| 7,538,845 | B2 * | 5/2009 | Hasegawa et al. ........... 349/141 |
| 2003/0002002 | A1 | 1/2003 | Kawachi et al. |
| 2003/0107037 | A1 | 6/2003 | Youn |
| 2003/0218664 | A1 | 11/2003 | Sakamoto et al. |
| 2005/0083462 | A1 | 4/2005 | Lin |
| 2005/0117104 | A1 | 6/2005 | Nishida et al. |
| 2005/0264746 | A1 | 12/2005 | Ou |
| 2007/0146591 | A1 | 6/2007 | Kimura |

FOREIGN PATENT DOCUMENTS

| JP | 09-269508 | 10/1997 |
| JP | 2001-343670 | 12/2001 |
| JP | 2003-15155 | 1/2003 |
| JP | 2003-207795 | 7/2003 |

* cited by examiner

*Primary Examiner*—Mike Qi
(74) *Attorney, Agent, or Firm*—Antonelli, Terry, Stout & Kraus, LLP.

(57) ABSTRACT

The present invention provides a liquid crystal display device which can reduce the difference in brightness between an image obtained from a reflection region and an image obtained from a transmission region. The liquid crystal display device includes a pixel electrode and a counter electrode in each pixel region on a liquid-crystal-side surface of one substrate out of respective substrates which are arranged to face each other with liquid crystal therebetween. The pixel region includes a transmission region and a reflection region. A gap between the pixel electrode and the counter electrode in the reflection region is set larger than the gap between the pixel electrode and the counter electrode in the transmission region.

3 Claims, 15 Drawing Sheets

LIQUID CRYSTAL DISPLAY DEVICE HAVING PARTICULAR ELECTRODES IN TRANSMISSION REGION AND IN REFLECTION REGION

CROSS REFERENCE TO RELATED APPLICATION

This application is a division of U.S. application Ser. No. 11/255,107, filed Oct. 21, 2005, now U.S. Pat. No. 7,538,845 the contents of which are incorporated herein by reference.

The present application claims priority from Japanese application JP2004-316250 filed on Oct. 29, 2004, the content of which is hereby incorporated by reference into this application.

BACKGROUND OF THE INVENTION

The present invention relates to a liquid crystal display device, and more particularly to a liquid crystal display device having pixel electrodes and counter electrodes in a pixel region formed on a liquid-crystal-side surface of one substrate out of respective substrates which are arranged to face each other in an opposed manner with liquid crystal therebetween.

This kind of liquid crystal display device is referred to as a so-called lateral electric field type (IPS type) liquid crystal display device, for example, and is known as a display device which has a so-called wide viewing angle characteristic compared to liquid crystal display devices adopting other methods.

On the other hand, although the liquid crystal display device is usually provided with a backlight or the like on a back surface of a liquid crystal display panel, recently, in view of the reduction of the power consumption, there has been known a liquid crystal display device which allows the recognition of an image by making use of an external light such as sun beams when necessary.

The liquid crystal display device is of a type which forms a so-called transmission region which allows light from the backlight or the like to pass therethrough in a portion of the pixel region and forms a reflection region which reflects light from sun beams and returns the light frontward in a remaining portion. The latter liquid crystal display device is provided with a reflector or a means which has a function of the reflector.

Various types of liquid crystal display devices having such a constitution have been disclosed in JP-A-2003-207795 (patent document 1), JP-A-2003-15155 (patent document 2), JP-A-2001-343670 (patent document 3), JP-A-9-269508 (patent document 4) and the like. However, in the patent document 1, a distance between electrodes in the reflection region is narrower than a distance between electrodes in a transmission region and hence, the liquid crystal display device disclosed in the patent document 1 differs from the liquid crystal display device of the present invention.

Further, in the patent document 2, a potential from a second signal line electrode 11 is supplied to a reflector provided to the inside of a pixel (see FIG. 15 and FIG. 16 in the document) and hence, the liquid crystal display device disclosed in the patent document 2 differs from the liquid crystal display device of the present invention.

Further, in the patent document 3, although a potential of a video signal is supplied to a reflector which also functions as a capacitance, the patent document 3 is directed to a so-called vertical electric field type liquid crystal display device and hence, the liquid crystal display device disclosed in the patent document 3 differs from the liquid crystal display device of the present invention.

Still further, in the patent document 4, a pair of electrodes are respectively formed of a stacked body constituted of a non-light-transmitting conductive layer and a light-transmitting conductive layer. However, although the non-light-transmitting conductive layer is provided with a light shielding function, the non-light-transmitting conductive layer is not provided with a reflection function and hence, the liquid crystal display device disclosed in the patent document 4 differs from the liquid crystal display device of the present invention.

SUMMARY OF THE INVENTION

With respect to the conventional liquid crystal display devices, inventors of the present invention have found out that there exists the difference in brightness between an image obtained from the reflection region and an image obtained from the transmission region and there arises a necessity to cope with such difference in brightness.

Further, on the premise of the constitution of the lateral electric field type liquid crystal display device, there also arises a task with respect to the manner of forming reflectors in the inside of a pixel region. That is, depending on the constitution, there may arise a drawback that a parasitic capacitance is generated.

Further, an optical path length of light in the inside of the liquid crystal is approximately twice as long as an optical path length of light in the reflection region and a change of a phase of light attributed to the difference in the optical path length of light brings about difference in image quality between the transmission region and the reflection region whereby there arises a necessity to cope with such difference in image quality.

The present invention has been made under such circumstances and it is an advantage of the present invention to provide a liquid crystal display device which can reduce the difference in brightness between an image obtained from a reflection region and an image obtained from a transmission region.

Further, it is another advantage of the present invention to provide a liquid crystal display device which can reduce a parasitic capacitance.

Still further, it is another advantage of the present invention to provide a liquid crystal display device which can suppress the difference in image quality attributed to the difference in optical path length in the inside of liquid crystal.

To briefly explain the summary of typical inventions among inventions disclosed in this specification, they are as follows.

(1) In a liquid crystal display device which includes a first substrate, a second substrate and liquid crystal sandwiched between the first substrate and the second substrate, the first substrate includes a first electrode having at least one linear portion and a second electrode having at least one linear portion in the inside of a pixel region, as viewed in a plan view, the linear portion of the first electrode and the linear portion of the second electrode are alternately arranged in the inside of the pixel region, the liquid crystal is driven by an electric field generated between the first electrode and the second electrode, the pixel region includes a transmission region which performs a display by allowing light from a back surface side to pass therethrough and a reflection region which performs a display by reflecting light from a front surface side, and as viewed in a plan view, a gap between the linear portion of the first electrode and the linear portion of the second electrode in the reflection region is larger than a gap between the linear portion of the first electrode and the linear portion of the second electrode in the transmission region.

(2) In a liquid crystal display device which includes a first substrate, a second substrate and liquid crystal sandwiched between the first substrate and the second substrate, the first substrate includes a first electrode having at least one linear portion and a second electrode having at least one linear portion in the inside of a pixel region, as viewed in a plan view, the linear portion of the first electrode and the linear portion of the second electrode are alternately arranged in the inside of the pixel region, the liquid crystal is driven by an electric field generated between the first electrode and the second electrode, the pixel region includes a transmission region which performs a display by allowing light from a back surface side to pass therethrough and a reflection region which performs a display by reflecting light from a front surface side, and assuming a layer thickness of the liquid crystal in the transmission region as dt and a layer thickness of the liquid crystal in the reflection region as dr, a relationship $0.75dt \leq dr \leq 1.1dt$ is established, and as viewed in a plan view, a gap between the linear portion of the first electrode and the linear portion of the second electrode in the reflection region is larger than a gap between the linear portion of the first electrode and the linear portion of the second electrode in the transmission region.

(3) In the constitution (1) or (2), as viewed in a plan view, with respect to at least either one of the linear portion of the first electrode and the linear portion of the second electrode, a width of the linear portion in the reflection region is smaller than a width of the linear portion in the transmission region.

(4) In a liquid crystal display device which includes a first substrate, a second substrate and a liquid crystal sandwiched between the first substrate and the second substrate, the first substrate includes a first electrode having a plurality of linear portions and a second electrode having a planar portion in the inside of a pixel region, the liquid crystal is driven by an electric field generated between the first electrode and the second electrode, the linear portions of the first electrode are arranged above the planar portion of the second electrode in an overlapped manner by way of an insulation film, the pixel region includes a transmission region which performs a display by allowing light from a back surface side to pass therethrough and a reflection region which performs a display by reflecting light from a front surface side, and as viewed in a plan view, a gap between the neighboring linear portions of the first electrode in the reflection region is larger than a gap of the neighboring linear portions of the first electrode in the transmission region.

(5) In a liquid crystal display device which includes a first substrate, a second substrate and a liquid crystal sandwiched between the first substrate and the second substrate, the first substrate includes a first electrode having a plurality of linear portions and a second electrode having a planar portion in the inside of a pixel region, the liquid crystal is driven by an electric field generated between the first electrode and the second electrode, the linear portions of the first electrode are arranged above the planar portion of the second electrode in an overlapped manner by way of an insulation film, the pixel region includes a transmission region which performs a display by allowing light from a back surface side to pass therethrough and a reflection region which performs a display by reflecting light from a front surface side, assuming a layer thickness of the liquid crystal in the transmission region as dt and a layer thickness of the liquid crystal in the reflection region as dr, a relationship $0.75dt \leq dr \leq 1.1dt$ is established, and as viewed in a plan view, a gap between the neighboring linear portions of the first electrode in the reflection region is larger than a gap of the neighboring linear portions of the first electrode in the transmission region.

(6) In the constitution (4) or (5), as viewed in a plan view, a width of the linear portion of the first electrode in the reflection region is smaller than a width of the linear portion of the first electrode in the transmission region.

(7) In a liquid crystal display device which includes a first substrate, a second substrate and a liquid crystal sandwiched between the first substrate and the second substrate, the first substrate includes a pixel electrode to which a video signal is applied and a counter electrode to which a signal which is common with at least one of neighboring pixel regions and becomes the reference with respect to the video signal is applied in the inside of a pixel region, the liquid crystal is driven by an electric field generated between the pixel electrode and the counter electrode, the pixel region includes a reflector which performs a reflection display by reflecting light from the front surface side on at least a portion of the pixel region, the reflector has at least a portion thereof overlapped to the pixel electrode and the counter electrode by way of an insulation film, and the reflector is formed independently for every pixel region and a signal which is equal to a signal applied to the pixel electrode is applied to the reflector.

(8) In the constitution (7), the first substrate includes gate signal lines to which a scanning signal is applied, drain signal lines to which the video signal is applied, thin film transistors which are connected with the gate signal lines and are driven in response to the scanning signal, and source electrodes to which the video signal is applied by way of the thin film transistors, and the reflector is formed by extending the source electrode.

(9) In the constitution (8), the liquid crystal display device includes a capacitance signal line which is formed at a position below the source electrode in an overlapped manner by way of a second insulation film.

(10) In any one of the constitutions (7) to (9), the pixel region includes a transmission region which performs a transmission display by allowing light from a back surface side to pass therethrough in at least a portion of the pixel region.

(11) In a liquid crystal display device which includes a first substrate, a second substrate and liquid crystal sandwiched between the first substrate and the second substrate, the first substrate includes a pixel electrode to which a video signal is applied and a counter electrode to which a signal which is common with at least one of neighboring pixel regions and becomes the reference with respect to the video signal is applied in the inside of a pixel region, the pixel region includes a reflector which performs a reflection display by reflecting light from the front surface side on at least a portion of the pixel region, the pixel electrode and the reflector are formed below the counter electrode and have at least portions thereof overlapped to the counter electrode by way of an insulation film, the reflector is independently formed for every pixel region and a signal equal to the signal applied to the pixel electrode is applied, and the liquid crystal is driven by an electric field which is generated between the pixel electrode which also functions as the reflector and the counter electrode.

(12) In the constitution (11), the first substrate includes gate signal lines to which a scanning signal is applied, drain signal lines to which the video signal is applied, thin film transistors which are connected with the gate signal lines and are driven in response to the scanning signal, and source electrodes to which the video signal is applied by way of the thin film transistors, and the reflector is formed by extending the source electrode.

(13) In the constitution (12), the liquid crystal display device includes a capacitance signal line which is formed at a position below the source electrode in an overlapped manner by way of a second insulation film.

(14) In any one of the constitutions (11) to (13), the pixel region includes a transmission region which performs a transmission display by allowing light from a back surface side to pass therethrough in at least a portion of the pixel region.

(15) In the constitution (14), the pixel electrode includes a light-transmitting conductive layer formed in the transmission region.

(16) In a liquid crystal display device which includes a first substrate, a second substrate and a liquid crystal sandwiched between the first substrate and the second substrate, the first substrate includes a first electrode and a second electrode in the inside of a pixel region, the liquid crystal is driven by an electric field generated between the first electrode and the second electrode, at least one of the first electrode and the second electrode is, as viewed in a plan view, constituted of a reflecting conductive layer and a light-transmitting conductive layer which is formed on at least a periphery of the reflecting conductive layer, and the reflecting conductive layer performs a reflection display by reflecting light from a front surface side.

(17) In the constitution (16), both of the first electrode and the second electrode are, as viewed in a plan view, constituted of a reflecting conductive layer and a light-transmitting conductive layer which is formed on at least a periphery of the reflecting conductive layer.

(18) In the constitution (16) or (17), the light-transmitting conductive layer is formed in a state that the reflecting conductive layer is covered with the light-transmitting conductive layer.

(19) In any one of the constitutions (16) to (18), the first electrode includes at least one linear portion in the inside of the pixel region, the second electrode includes at least one linear portion in the inside of the pixel region, as viewed in a plan view, the linear portion of the first electrode and the liner portion of the second electrode are alternately arranged in the inside of the pixel region, and the linear portion of at least one of the first electrode and the second electrode is, as viewed in a plan view, constituted of the reflecting conductive layer and the light-transmitting conductive layer formed on at least a periphery of the reflecting conductive layer.

Here, the present invention is not limited to the above-mentioned constitutions and various modifications can be made without departing from the technical concept of the present invention.

BRIEF DESCRIPTION OF THE DRAWINGS

FIG. 17A and FIG. 17B are graphs showing B-V characteristics, wherein FIG. 17A is the graph showing the B-V characteristics of a reflection region and a transmission region in a state that a gap between a pair of electrodes is equal and FIG. 17B is the graph showing the B-V characteristic of the reflection region and the transmission region in a state that a gap between a pair of electrodes is different;

DESCRIPTION OF THE PREFERRED EMBODIMENTS

Embodiments of a liquid crystal display device according to the present invention are explained in conjunction with attached drawings hereinafter.

Embodiment 1

Figure 5:
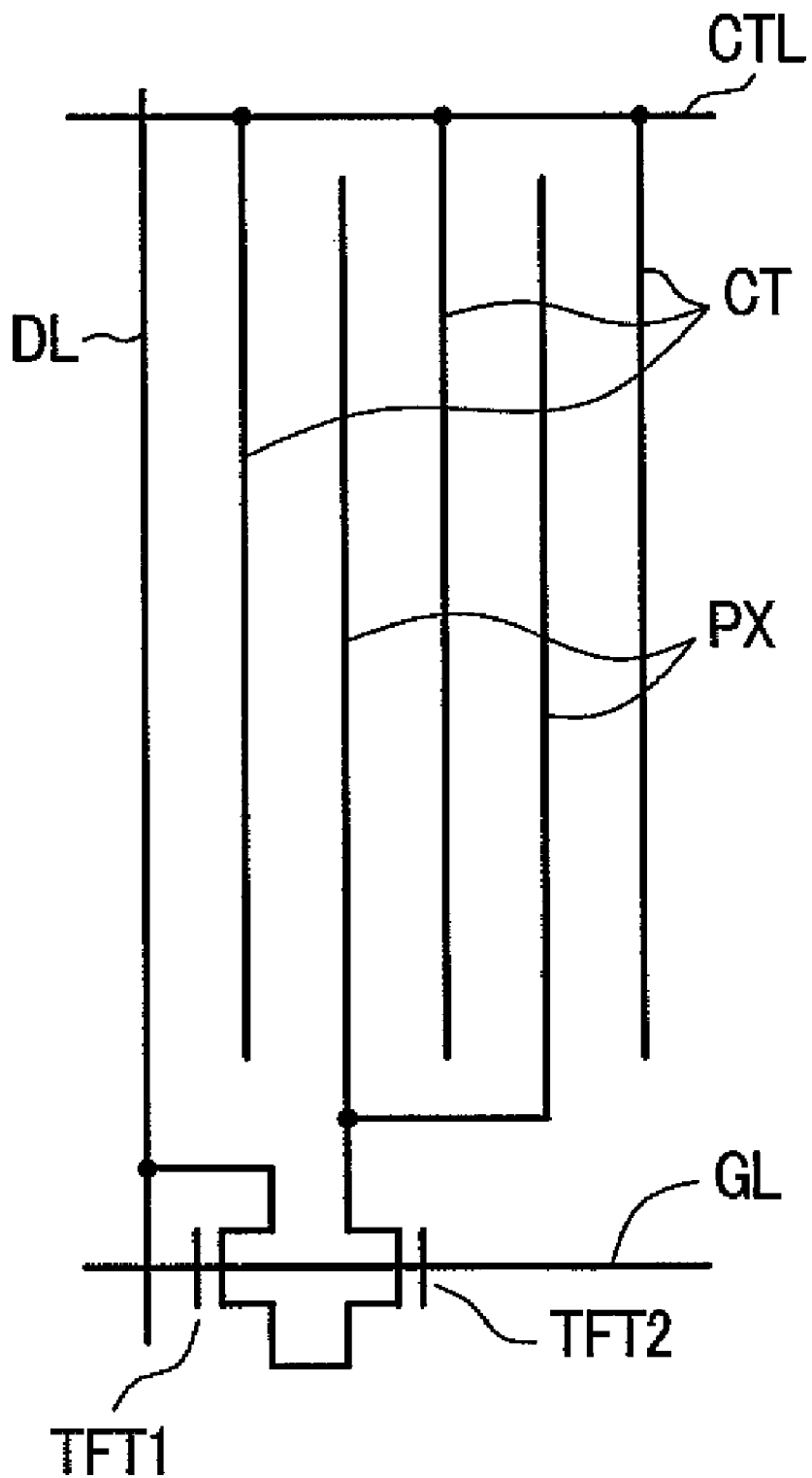
FIG. 5 is an equivalent circuit diagram showing one embodiment of the constitution of the pixel of the liquid crystal display device according to the present invention.

FIG. 5 is a graph showing one embodiment of an equivalent circuit showing one pixel of the liquid crystal display device according to the present invention, wherein a common signal line CTL runs at a portion corresponding to an upper side of a region of the pixel formed in a rectangular shape, a gate signal line (scanning signal line) GL runs at a portion corresponding to a lower side of the region of the pixel, and a drain signal line (video signal line) DL runs at a portion corresponding to a left side.

Other pixels which are arranged close to the pixel in the left, right, upper and lower directions have the substantially same constitution, wherein the common signal line CTL and the gate signal line GL are used in common with respect to other pixels which are arranged close to the pixel in the lateral direction, and the drain signal line DL is used in common with respect to other pixels which are arranged close to the pixel in the vertical direction.

Further, the gate signal line GL is connected to respective gate electrodes of two switching elements TFT1, TFT2, wherein the respective switching elements TFT1, TFT2 are turned on in response to a scanning signal supplied from the gate signal line GL.

A video signal from the drain signal line DL is supplied to the pixel electrode PX through the respective switching elements TFT1, TFT2 which are turned on, wherein the video signal is supplied to one switching element TFT2 from one switching element TFT1.

The pixel electrode PX is constituted of a group of electrodes formed of a plurality of (two pieces in the drawing) electrodes which extend in the running direction of the drain signal line DL and are arranged in parallel on the running direction side of the gate signal line GL in the inside of the pixel region.

Further, the pixel includes a counter electrode CT which generates an electric field between the pixel electrode PX and the counter electrode CT, wherein the counter electrode CT is also constituted of a group of electrodes formed of a plurality of (three pieces in the drawing) electrodes which extend in the running direction of the drain signal line DL and are arranged in parallel on the running direction side of the gate signal line GL, and the respective electrodes of the counter electrode CT are alternately arranged with respective electrodes of the pixel electrode PX.

One ends of respective electrodes of the counter electrode CT are connected to the common signal lien CTL, and a signal which becomes the reference with respect to the video signal is applied to the respective electrodes of the counter electrode CT by way of the common signal line CTL.

Here, although two switching elements are used in the above-mentioned equivalent circuit diagram, the present invention is not limited to such a case and it is needless to say that the pixel includes one switching element, for example.

Figure 1:
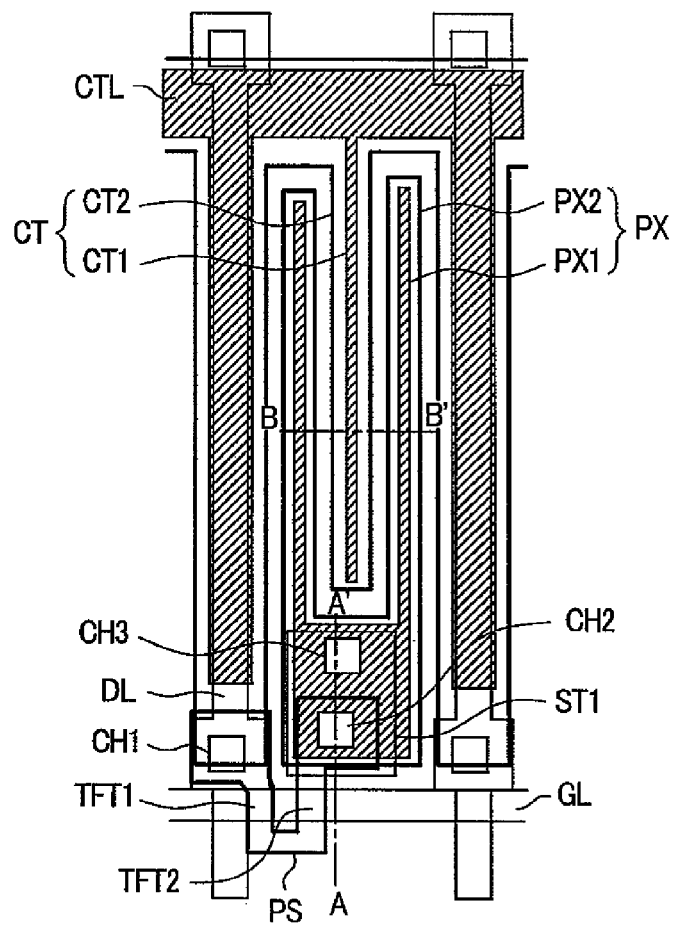
FIG. 1 is a plan view showing one embodiment of the constitution of a pixel of a liquid crystal display device according to the present invention.
Figure 2:
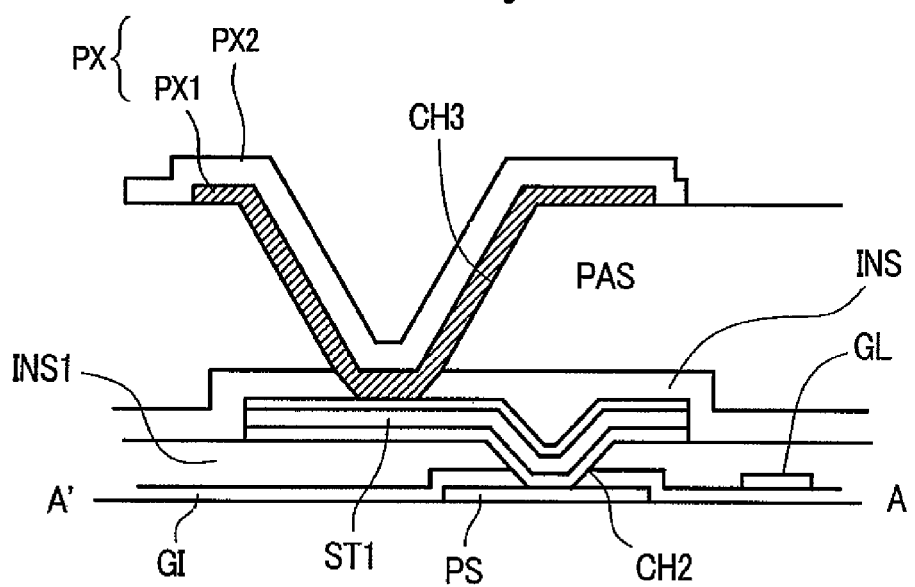
FIG. 2 is a cross-sectional view taken along a line A-A' in FIG. 1.

FIG. 1 is a plan view showing the constitution of the pixel region which embodies the equivalent circuit shown in FIG. 5 and the constitution is substantially geometrically equal to the equivalent circuit. Further, FIG. 2 shows a cross-sectional view taken along a line A-A' in FIG. 1. Here, the switching elements TFT1, TFT2 are formed of so-called thin film transistors TFT1, TFT2.

In FIG. 1, on a main surface of a substrate not shown in the drawing, first of all, a poly-silicon layer PS which forms semiconductor layers of the thin film transistors TFT1, TFT2 is formed. Since the pixel includes two switching elements as described above, the poly-silicon layer PS is formed to wind through a region where the gate signal line GL is formed one time thus forming two intersecting portions with the gate signal line GL. Here, a background layer (not shown) may be formed between the substrate not shown in the drawing and the poly-silicon layer PS. Further, although an example which uses poly-silicon as a material of the semiconductor layer is explained in this embodiment, amorphous silicon may be used as the material of the semiconductor layer. Further, semiconductor other than silicon may be used.

On the substrate, an insulation film GI (see FIG. 2) is formed in a state that the insulation film GI also covers the poly-silicon layer PS. The insulation film GI also functions as a gate insulation film in regions where thin film transistors TFT1, TFT2 are formed.

The gate signal line GL is formed on an upper surface of the insulation film GI, and a first interlayer insulation film INS1 (see FIG. 2) is also formed on the substrate in a state that the first interlayer insulation film INS1 covers the gate signal line GL. For example, MoW is used as a material of the gate signal line GL.

On an upper surface of the first interlayer insulation film INS1, the drain signal line DL and first source electrodes ST1 of the thin film transistors TFT2 (electrodes which are connected with the pixel electrodes PX described later) are formed.

The drain signal lines DL and the first source electrodes ST1 are constituted of a conductive film having the three-layered structure in which a MoW layer, an Al layer and a MoW layer are sequentially stacked, for example. It is because that, as will be described explicitly later, to establish the connection with the poly-silicon layer PS or the pixel electrode PX, the first source electrode ST1 at least requires a buffer layer made of MoW or the like at least on a connection surface thereof. Accordingly, for example, Ag or the like can be also selected besides MoW as the material of the buffer layer. Here, when materials which can obtain a favorable contact are selected as metal which is used as the material of the first source electrode ST1 and another conductive film connected to the first source electrode ST1, the buffer layer may be omitted.

The drain signal line DL is connected with a drain region of one thin film transistor TFT1 via a contact hole CH1 formed in the first interlayer insulation film INS1 and the insulation film GI.

The first source electrode ST1 is connected with the source region of another thin film transistor TFT2 via a contact hole CH2 formed in the first interlayer insulation film INS1 and the insulation film GI.

On an upper surface of the first interlayer insulation film INS1, a second interlayer insulation film INS2 (see FIG. 2) is formed in a state that the second interlayer insulation film INS2 also covers the drain signal lines DL and the first source electrodes ST1, while on an upper surface of the second interlayer insulation film INS2, a protective film PAS (see FIG. 2) is formed. The protective film PAS is constituted of an organic material layer which is formed by coating, for example. The protective film PAS is provided for leveling a surface.

In portions of the protective film PAS, contact holes CH3 which also penetrate the second interlayer insulation film INS2 arranged below the protective film PAS are formed. The contact hole CH3 is formed to expose a portion of the first source electrode ST1 thus establishing the connection of the pixel electrode PX described later and the first source electrode ST1 via the contact hole CH3.

On an upper surface of the protective film PAS, the pixel electrodes PX, the counter electrodes CT and the common signal lines CTL which are connected with the counter electrodes CT are formed.

Here, these pixel electrodes PX, counter electrodes CT and common signal liens CTL which are connected with the counter electrodes CT are formed of the two-layered structure in which a reflecting conductive film made of, for example, Al, MoW, Ag or the like and a light-transmitting conductive film made of ITO(Indium Tin Oxide) are sequentially stacked.

The pixel electrode PX includes at least one linear portion. In FIG. 1, two linear portions of the pixel electrode PX have one ends thereof on the thin film transistors TFT1, TFT2 side connected with each other, and the connecting portions are arranged to cover the contact hole CH3. Due to such a constitution, the connection between the pixel electrode PX and the first source electrode ST1 is established.

The counter electrode CT includes at least one linear portion. In FIG. 1, three linear portions of the counter electrode CT are connected with each other using the common signal line CTL. Here, among these three linear portions, two linear portions on both sides are used in common by the neighboring pixel and hence, these two linear portions also function as the counter electrodes CT of the neighboring pixel regions. Among respective electrodes of the linear portions of the counter electrode CT, the electrodes which are arranged close to the drain signal line DL are formed in a state that the electrodes sufficiently cover the drain signal line DL. That is, the electrode and the drain signal line DL are arranged in a state that a center line of the electrode is substantially aligned with a center line of the drain signal line DL and, at the same time, a width of the electrode is set larger than a width of the drain signal line DL. Due to such a constitution, lines of electric force attributed to the signal from the drain signal line DL are terminated to the electrode side thus obviating the termination of the electric lines of force to the pixel electrode PX side whereby an image is prevented from generating noises.

The linear portions of the pixel electrode PX and the linear portions of the counter electrode CT are alternately arranged in the inside of the pixel region.

Here, the linear portions of the pixel electrode PX and the linear portions of the counter electrode CT are not always formed of a straight line. In this specification, the linear portion is not limited to the straight line and includes a curve or a line which is bent in a midst portion thereof.

Although orientation films are formed on surfaces of the pair of substrates which are directly brought into contact with the liquid crystal, these orientation films are omitted from the drawing. Further, although a backlight is arranged on a back surface side (a side opposite to a viewer) of the liquid crystal display panel, the backlight is omitted from the drawing.

Figure 3:
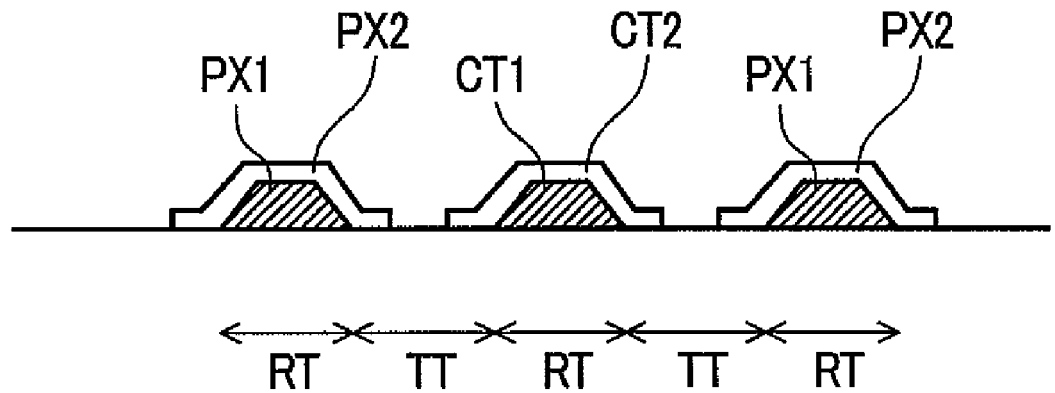
FIG. 3 is a cross-sectional view taken along a line B-B' in FIG. 1 and also is a drawing which shows the constitution of a pixel electrode and a counter electrode of the liquid crystal display device according to the present invention.

FIG. 3 is a view showing cross sections of the counter electrode CT and the pixel electrode PX taken along a line B-B' in FIG. 1.

As described above, the counter electrode CT and the pixel electrode PX are respectively formed of the two-layered structure in which the reflecting conductive layer and the light-transmitting conductive layer are sequentially stacked.

Here, with respect to the counter electrode CT, a portion thereof which is formed of the reflecting conductive layer is referred to as a counter electrode CT1 and a portion thereof which is formed of the light-transmitting conductive layer is referred to as a counter electrode CT2, while with respect to the pixel electrode PX, a portion thereof which is formed of the reflecting conductive layer is referred to as a pixel electrode PX1 and a portion thereof which is formed of the light-transmitting conductive layer is referred to as a pixel electrode PX2.

As a material of the light-transmitting conductive layer, besides the above-mentioned ITO, ITZO (Indium Tin Zinc Oxide), IZO (Indium Zinc Oxide), $SnO_2$ (Tin Oxide) $In_2O_3$ (Indium Oxide) or the like can be also selected.

As a material of the reflective conductive layer, Al, MoW, Ag or the like can be used. It is desirable that the reflectance is 50% or more. It is more desirable that the reflectance is 70% or more. For example, since the reflectance of Al is approximately 95%, Al is suitable as the material of the reflecting conductive layer.

Here, when Al is used as a material of the reflecting conductive layer, an electrical contact with the light-transmitting conductive layer is not favorable and hence, it is desirable to connect the reflecting conductive layer with the light-transmitting conductive layer by way of a buffer layer not shown in the drawing at least one portion. When MoW, Ag or the like is used as the material of the reflecting conductive layer, the reflecting conductive layer exhibits the favorable electric contact with the light-transmitting conductive layer and hence, the buffer layer may be omitted.

In FIG. 3, for example, the pixel electrode PX1 has side wall surfaces of respective sides thereof formed in a tapered shape with a width thereof expanding toward a distal end thereof, and the pixel electrode PX2 is formed so as to cover the pixel electrode PX1.

That is, a center axis which is arranged in the extending direction of the pixel electrode PX1 is substantially aligned with a center axis of the pixel electrode PX2, while a width of the pixel electrode PX2 is set larger than a width of the pixel electrode PX1. In other words, the pixel electrode PX2 is configured to project outwardly from surroundings (peripheries) of the pixel electrode PX1.

Such a constitution is also adopted by the counter electrode CT, wherein the counter electrode CT1 has side wall surfaces of respective sides thereof formed in a tapered shape with a width thereof expanding toward a distal end thereof, and the counter electrode CT2 is formed so as to cover the counter electrode CT1.

That is, a center axis which is arranged in the extending direction of the counter electrode CT1 is substantially aligned with a center axis of the counter electrode CT2, while a width of the counter electrode CT2 is set larger than a width of the counter electrode CT1. In other words, the counter electrode CT2 is configured to project outwardly from surroundings (peripheries) of the counter electrode CT1.

In the pixel region which includes the pixel electrode PX and the counter electrode CT having such a constitution, so-called reflection regions RT and so-called transmission regions TT are formed. The reflection regions RT are regions where the counter electrodes CT1 and the pixel electrodes PX1 are formed. The transmission regions TT are remaining regions and also include portions where the counter electrodes CT2 and the pixel electrodes PX2 are formed.

When the pixel region is viewed in a plan view, with respect to a layer surface on which the pixel electrode PX and the counter electrode CT are formed, the regions where the reflecting conductive layer is formed function as the reflection regions RT, while the remaining regions excluding the regions where the reflecting conductive layer is formed and including regions where the light-transmitting conductive layer is formed and regions where the light-transmitting conductive layer is not formed function as the transmission region TT.

Next, advantageous effects of the present invention are explained.

Figure 4:
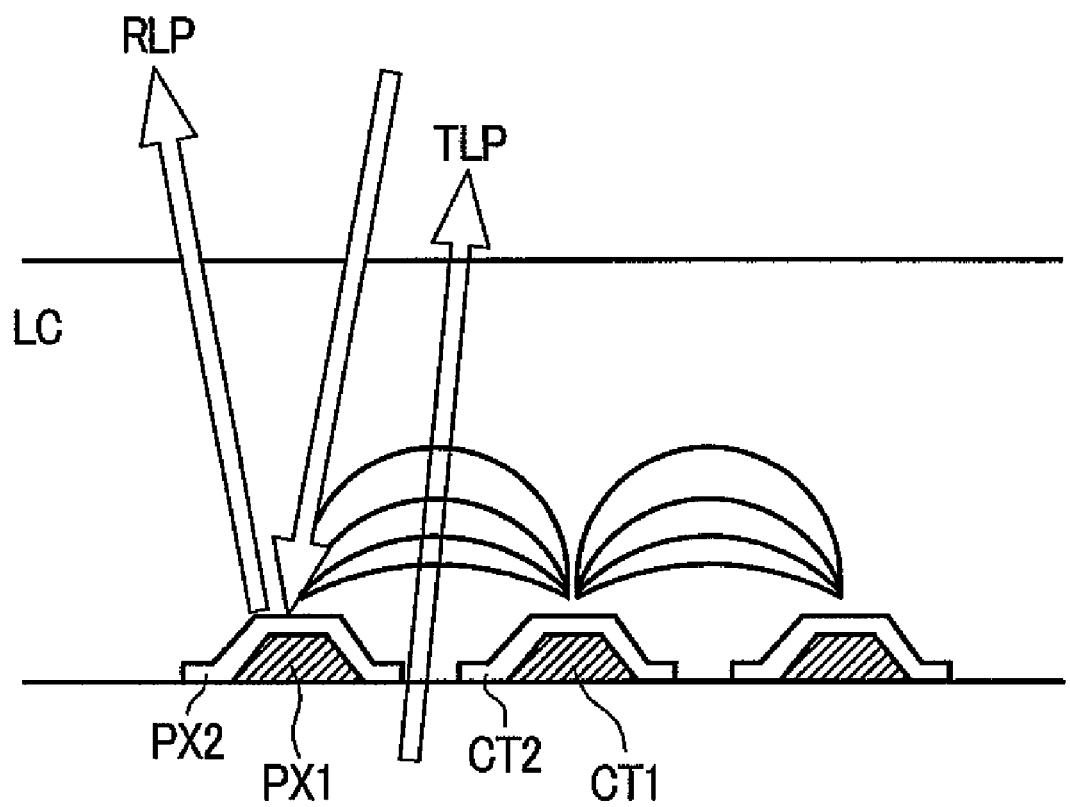
FIG. 4 is an explanatory view of the pixel of the liquid crystal display device according to the present invention which has a transmission region and a reflection region.

FIG. 4 shows a transmission optical path TLP and a reflection optical path RLP which pass through the inside of the liquid crystal LC in a state that an electric field (or electric lines of force) is generated between the counter electrode CT and the pixel electrode PX and the liquid crystal LC is activated in response to the electric field.

The transmission optical path TLP is formed of a path along which light passes through between the counter electrode CT1 and the pixel electrode PX1, while the reflection optical path RLP is formed of a path along which light irradiated to the counter electrode CT1 or the pixel electrode PX1 is reflected on the counter electrode CT1 or the pixel electrode PX1.

In this case, an optical path length of the reflecting light which passes through the liquid crystal is twice as long as an optical path length of the transmitting light since the reflecting light reciprocates. Assuming that the behavior of the liquid crystal is at the substantially same level between the transmission region TT and the reflection region RT when the liquid crystal is driven by the electric field, the influence (phase shift or the like) which is applied to the light when the light passes through the liquid crystal in the reflection region RT becomes approximately twice as large as the corresponding influence in the transmission region TT. Accordingly, there arises a drawback that the brightness differs between the transmission regions TT and the reflection regions RT.

However, due to the provision of the above-mentioned constitutions, the present invention can obtain advantageous effects to suppress such a drawback.

That is, as can be readily understood from the distribution of the electric lines of force shown in FIG. 4, at locations in the vicinity of the center right above the counter electrode CT and the pixel electrode PX (right above the counter electrode CT1 and the pixel electrode PX1), components of the electric field substantially parallel to the substrate are small and hence, it is possible to suppress the behavior of the liquid crystal at the portions to a level substantially one half of a level of the behavior of the liquid crystal in the vicinity of the portions.

Accordingly, even when the reflecting light having the long optical path length in the inside of the liquid crystal receives the phase shift corresponding to the optical path length, the level of the phase shift eventually becomes equal to the phase shift of light which the transmitting light having the short optical path length receives.

Accordingly, it is possible to reduce the drawback that the image display attributed to the transmitting light and the image display attributed to the reflecting light differ from each other.

Further, the counter electrode CT and the pixel electrode PX are not formed of only the reflecting conductive layer but are formed of the sequential two-layered structure formed of the reflecting conductive layer and the light-transmitting conductive layer and, at the same time, the light-transmitting conductive layer projects outwardly from the reflecting conductive layer and hence, it is possible to obtain following advantageous effects.

That is, assuming that the counter electrode CT and the pixel electrode PX are formed of only the reflecting conductive layer (only the counter electrode CT1, the pixel electrode PX1), the regions where these respective electrodes are formed are all constituted as the reflection region and hence, a distance between the electrode and other electrode arranged close to the electrode is increased. In this case, the electric field between the respective electrodes becomes weak and the display in the transmission regions TT is deteriorated.

To cope with such a drawback, it may be possible to narrow the distance between the counter electrode CT1 and the pixel electrode PX1. In this case, however, it is necessary to increase the number of electrodes in the pixel region and hence, an area which the transmission region TT occupies becomes small.

To the contrary, by adopting the constitution in which the counter electrode CT and the pixel electrode PX are formed of the sequential two-layered structure formed of the reflecting conductive layer and the light-transmitting conductive layer and, at the same time, the light-transmitting conductive layer projects outwardly from the reflecting conductive layer, it is possible to ensure the sufficient area which the transmission regions TT occupy while maintaining the intensity of the electric field in the transmission regions TT by setting the distance of the gap between the respective electrodes (the counter electrode CT2 and the pixel electrode PX2 in this case), to a proper value. Further, the molecules of the liquid crystal LC exhibit the larger degree of behavior in peripheral portions of the counter electrode CT and the pixel electrode PX (the projecting portions of the counter electrode CT2 and the pixel electrode PX2) than the center portions of the counter electrode CT and the pixel electrode PX (right above the counter electrode CT1 and the pixel electrode PX1) and hence, when the constitution is used in the reflection display, there arises a drawback that the phase shift of light in the portion becomes excessively large. However, since a certain amount of the behavior of the liquid crystal is ensured in the portion, it is possible to obtain the phase shift of light to an extent which allows the constitution to be used in the transmission display. Accordingly, by using such a portion as the transmission regions TT, it is possible to further enhance the brightness of the transmission regions TT while reducing the influence attributed to the above-mentioned drawback.

As described above, according to the present invention, it is possible to establish the balance between the reflectance and the transmissivity as a whole and, at the same time, it is possible to realize the bright display.

Further, in this embodiment, the reflecting conductive layer (CT1, PX1) formed of the metal layer is sufficiently covered with the light-transmitting conductive layer (CT2, PX2) and hence, it is possible to obtain the advantageous effect that the direct contact of the reflecting conductive layer with the liquid crystal or the contact of the reflecting conductive layer with the liquid crystal by way of the orientation film not shown in the drawing can be obviated. This is because that assuming the reflecting conductive layer is brought into contact with the liquid crystal, a specific resistance of the liquid crystal is changed due to substances which are dissolved from the conductive layer and the substances ill-affect the image quality.

Accordingly, it is needless to say that when a burrier layer or the like which interrupts the intrusion of the dissolved substances in the liquid crystal is formed above the pixel electrode PX and the counter electrode CT by forming an insulation film or the like, for example, it is not always necessary to sufficiently cover the reflecting conductive layer (CT1, PX1) with the light transmitting conductive layer (CT2, PX2). It is also possible to overlap the reflecting conductive layer and the light-transmitting conductive layer with an insulation film interposed therebetween.

Here, in this embodiment, the sequential stacked body formed of the reflecting conductive layer and the light-transmitting conductive layer is also applied to the common signal line CTL. In general, the light-transmitting conductive layer exhibits the large electric resistance and hence, the electric resistance of the common signal line CTL is reduced by connecting the light-transmitting conductive layer with the reflecting conductive layer which exhibits the low electric resistance.

Here, although both of the pixel electrode PX and the counter electrode CT adopt the sequential stacked body formed of the reflecting conductive layer and the light-transmitting conductive layer, either one of the pixel electrode PX and the counter electrode CT may adopt the sequential stacked body.

Embodiment 2

Figure 6:
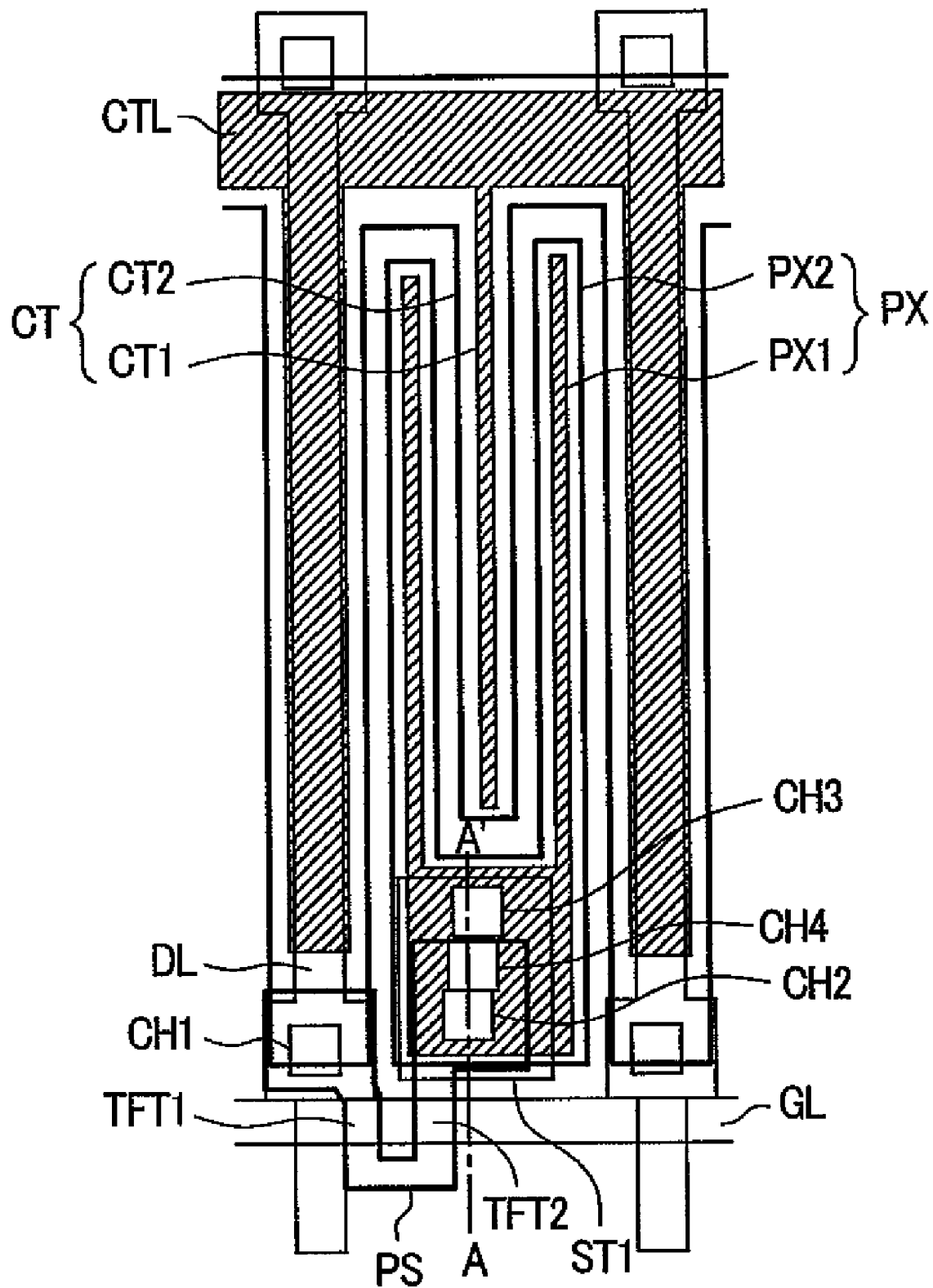
FIG. 6 is a plan view showing another embodiment of the constitution of the pixel of the liquid crystal display device according to the present invention.
Figure 7:
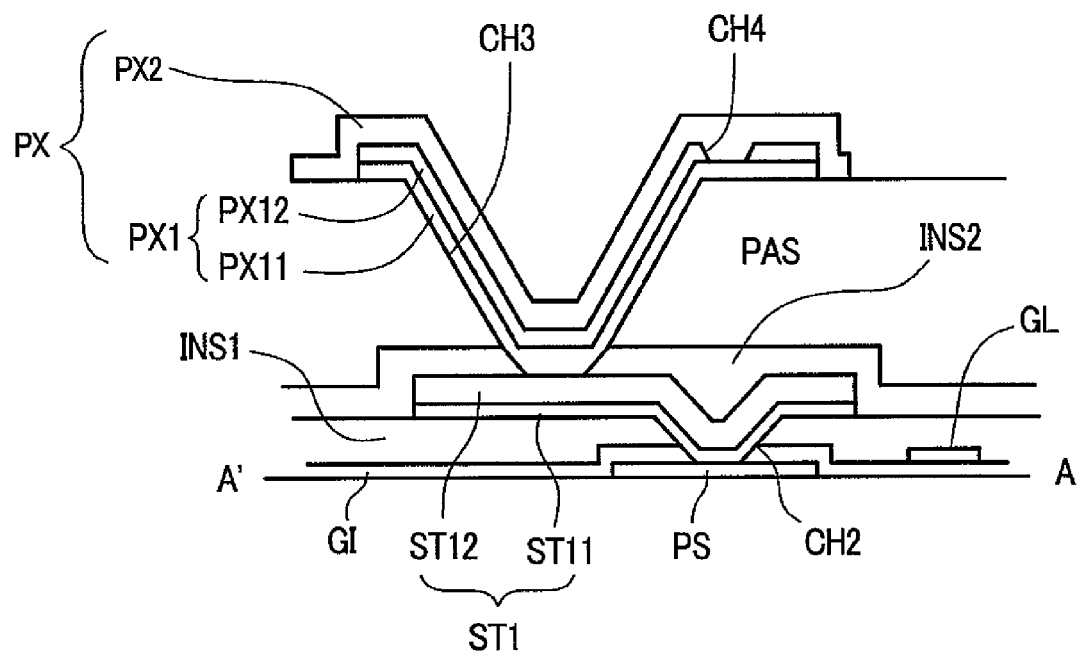
FIG. 7 is a cross-sectional view taken along a line A-A' in FIG. 6.

FIG. 6 is a plan view showing another embodiment of the liquid crystal display device according to the present invention and corresponds to FIG. 1. The liquid crystal display device has an equivalent circuit substantially equal to the equivalent circuit shown in FIG. 5. Further, FIG. 7 is a cross-sectional view taken along a line A-A' in FIG. 6.

The constitution which makes this embodiment different from the embodiment shown in FIG. 1 lies, first of all, in that the above-mentioned first metal layers (CT1, PX1) in the counter electrode CT and the pixel electrode PX are formed of the two-layered structure in which, for example, a MoW layer (indicated by symbol PX11 in the drawing) and an Al layer (indicated by symbol PX12 in the drawing) are sequentially stacked.

Al exhibits the high reflectance (approximately 95%) and hence, it is desirable to adopt the region formed of the Al layer as the reflection region RT.

Accordingly, for example, the pixel electrode PX is formed of the three-layered structure including the uppermost pixel electrode PX2 thus providing the constitution in which the conductive layers made of MoW, Al and ITO from the lowermost layer are sequentially stacked.

Further, the first source electrode ST1 of the thin film transistor TFT is formed of the two-layered structure in which an MoW layer (indicated by symbol ST11 in the drawing) and an Al layer (indicated by symbol ST12 in the drawing) are sequentially stacked.

In this case, the connection of the first source electrode ST1 and the pixel electrode PX in the contact hole CH3 can ensure the favorable electric connection since Al of the first source electrode ST1 and MoW of the pixel electrode PX are brought into contact with each other.

However, in the pixel electrode PX, the electric connection between ITO of the uppermost layer and Al of the lower layer is relatively unfavorable and hence, a contact hole CH4 is formed in Al in the vicinity of the contact hole CH3 thus ensuring the electric connection between ITO of the uppermost layer and MoW of the lowermost layer. This is because that the connection of ITO and MoW can improve the electric connection.

The materials which are exemplified in this embodiment are only examples and the materials can be suitably changed. For example, Al is replaceable with other material provided that the material can form the reflecting conductive layer, ITO is replaceable with other material provided that the material can form the light-transmitting conductive layer, and MoW is replaceable with other material provided that the material can function as a buffer layer when two conductive layers are electrically connected with each other.

Embodiment 3

In the above-mentioned embodiments, the portion which functions as the pixel electrode PX and the counter electrode CT is provided with the pixel electrode PX1 and the counter electrode CT1 which are formed of the reflecting conductive layer. In other words, in the inside of the substantial pixel region (for example, in an aperture region of a black matrix), the transmission region and the reflection region are substantially uniformly arranged.

However, when it is necessary to allow the transmission region to ensure an area sufficiently larger than an area of the reflection region, it is needless to say that the pixel region is imaginarily divided and one half is configured to possess both of the reflection region RT and the transmission region TT and another half does not possess the reflection region RT and possesses only the transmission region TT.

Figure 15:
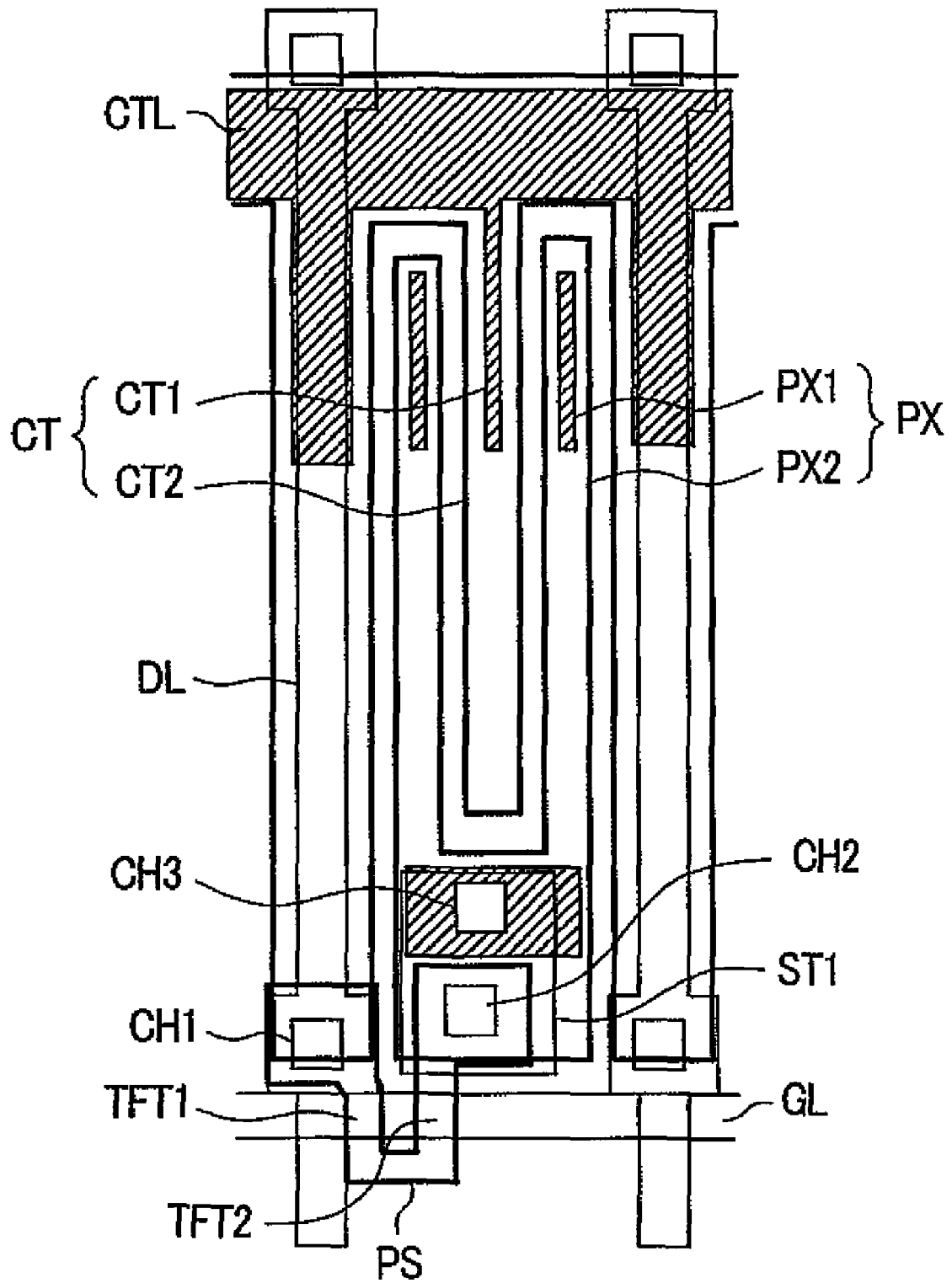
FIG. 15 is a plan view showing another embodiment of the constitution of the pixel of the liquid crystal display device according to the present invention.

FIG. 15 is a plan view of the pixel electrode having such a constitution and corresponds to FIG. 1.

As can be readily understood from FIG. 15, using an imaginary line segment which passes through the substantially center of the pixel region and is arranged parallel to the gate signal line GL as a boundary, the pixel electrode PX and the counter electrode CT in the thin-film-transistor-TFT side region are only constituted of the pixel electrode PX2 and the counter electrode CT2 formed of the light-transmitting conductive layer and the pixel electrode PX1 and the counter electrode CT1 formed of the reflecting conductive layer are not formed.

Accordingly, with respect to the imaginary line segment, only the pixel electrode PX and the counter electrode CT (and the common signal line CTL) on the side opposite to the thin film transistor TFT are constituted of the sequential stacked body formed of the reflecting conductive layer and the light-transmitting conductive layer.

However, it is needless to say that such a constitution merely constitutes one example and shows the constitution in which an area ratio between the reflection region RT and the transmission region TT can be freely set and the mode of division can be arbitrarily set.

Embodiment 4

Figure 8:
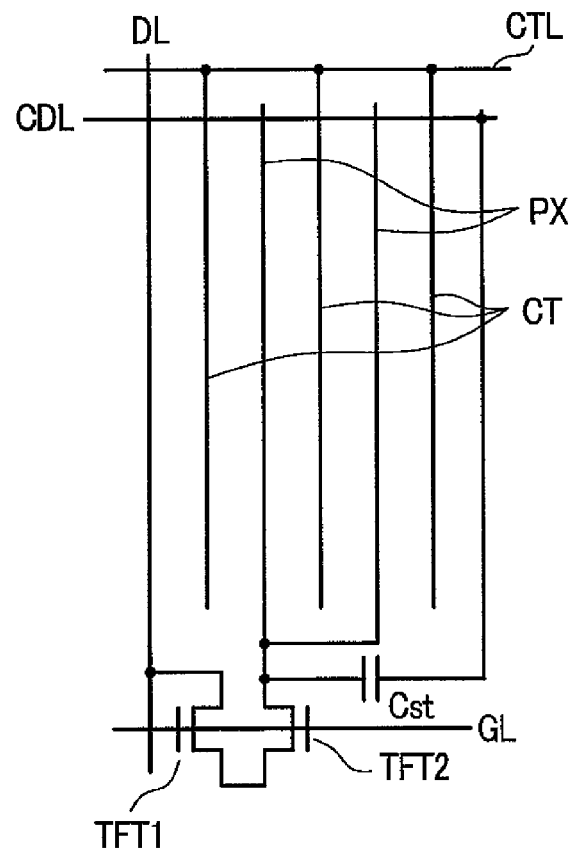
FIG. 8 is an equivalent circuit diagram showing another embodiment of the constitution of the pixel of the liquid crystal display device according to the present invention.

FIG. 8 is an equivalent circuit diagram showing another embodiment of the constitution of the pixel of the liquid crystal display device according to the present invention and corresponds to FIG. 5.

The constitution which makes this embodiment different from the embodiment shown in FIG. 5 lies in that the pixel of this embodiment includes a capacitance signal line CDL and a capacitive element Cst is formed between the capacitance signal line CDL and the pixel electrode PX or the electrode (first source electrode ST1 or the like) having a potential equal to a potential of the pixel electrode PX. The capacitive element Cst is provided for storing the video signal supplied to the pixel electrode PX for a long time. Here, the capacitance signal line CDL is also formed in common with pixels which are arranged on both left and right sides of the pixel electrode PX. A given potential (for example, a potential equal to a potential of the counter electrode CT) is applied to the capacitance signal line CDL.

Figure 9:
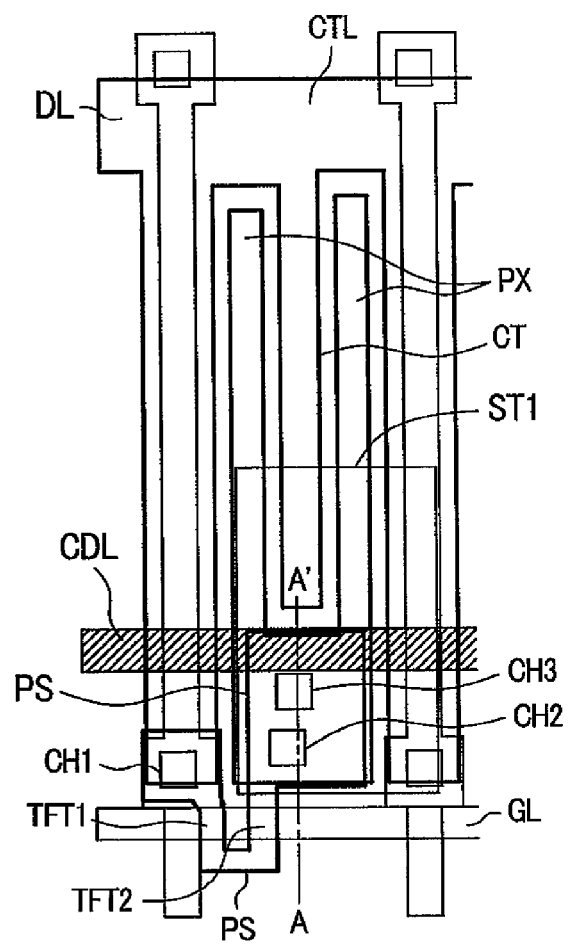
FIG. 9 is a plan view showing another embodiment of the constitution of the pixel of the liquid crystal display device according to the present invention.
Figure 10:
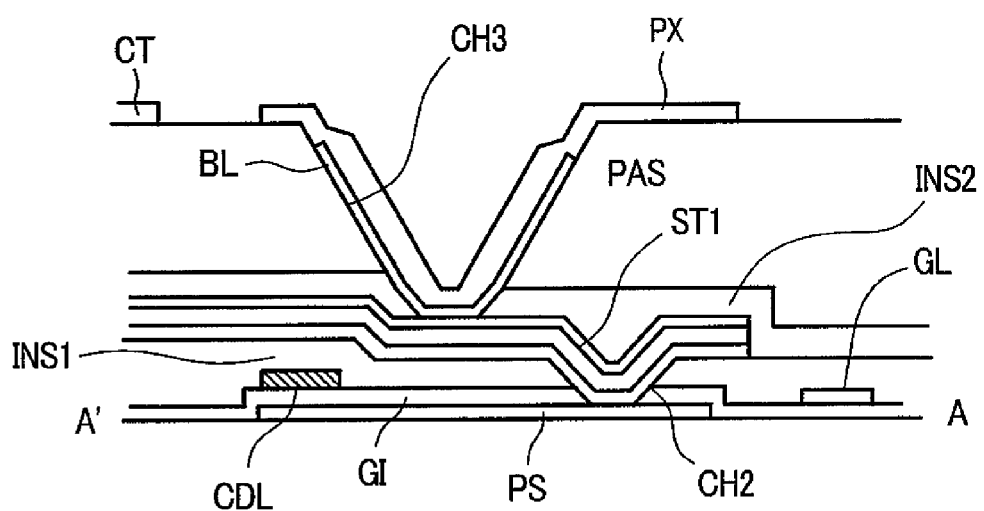
FIG. 10 is a cross-sectional view taken along a line A-A' in FIG. 9.

FIG. 9 is a plan view showing a case in which the equivalent circuit shown in FIG. 8 is applied to the constitution of the pixel. Further, a cross-sectional view taken along a line A-A' in FIG. 9 is shown in FIG. 10. Here, the explanation is made herein after by focusing on only points which make this embodiment different from the embodiments described heretofore and the explanation of parts which are common with the parts of the embodiments described heretofore is omitted.

On an upper surface of the insulation film GI, gate signal lines CL and capacitance signal lines CDL are formed. The gate signal lines GL and the capacitance signal lines CDL are formed in a same step and MoW is selected as a material of the gate signal lines GL and the capacitance signal lines CDL.

Further, a first interlayer insulation film INS is formed on the upper surface of the insulation film GI in a state that the first interlayer insulation film INS also covers the gate signal lines GL and the capacitance signal lines CDL (see FIG. 10).

On an upper surface of the first interlayer insulation film INS1, drain signal lines DL and first source electrodes ST1 of thin film transistors TFT2 are formed.

The drain signal line DL and the first source electrode ST1 are, for example, constituted of the three-layered structure conductive film in which a MoW layer, an Al layer and a MoW layer are sequentially stacked. Here, the MoW layers are formed as buffer layers and may be formed of other material. Further, the MoW layers may be omitted when unnecessary.

Here, the first source electrode ST1 is configured to function also as a reflector in a reflection region of the pixel. That is, using an imaginary line segment which passes through the substantially center of the pixel region and is arranged parallel to the gate signal line GL as a boundary, the first source electrode ST1 is formed on a region of a side on which a thin film transistor TFT is formed in a state that the first source electrode ST1 is extended over a substantially whole area of the region, and the reflector is constituted at the portion where the thin film transistor TFT is formed. Here, the reflector is not limited to the size, the shape and the position illustrated in the drawing and they can be arbitrarily changed corresponding to a ratio between the reflection region and the transmission region.

Further, the capacitance signal line CDL is formed below the first source electrode ST1 which also functions as the reflector by way of a first interlayer insulation film INS and a capacitance Cst which uses the first interlayer insulation film INS as a dielectric film is formed in an overlapped portion of the capacitance signal line CDL and the first source electrode ST1.

Further, as shown in the drawing, a poly-silicon layer PS is expanded to a position where the poly-silicon layer PS is overlapped to the capacitance signal line CDL thus forming a second capacitance which uses the insulation film GI as a dielectric layer.

On an upper surface of a protective film PAS, pixel electrodes PX, counter electrodes CT and common signal lines CTL which are connected with the counter electrodes CT are formed.

Here, the pixel electrodes PX, the counter electrodes CT and the common signal lines CTL which are connected with the counter electrodes CT are formed of a light-transmitting conductive layer (only one layer in this embodiment) made of ITO (Indium Tin Oxide).

In this manner, on at least the portion of the pixel region, the reflector which performs the reflection display by reflecting light from a front surface side is formed. The reflector is configured to have at least a portion thereof overlapped to the pixel electrode PX and the counter electrode CT by way of an insulation film (for example, a protective film PAS or the like).

In a portion of a contact hole CH3, a buffer layer BL made of MoW or the like, for example, is interposed between the pixel electrode PX and the first source electrode ST1 thus establishing the reliable electric connection between the pixel electrode PX and the first source electrode ST1.

Here, in this embodiment, either one of the buffer layer BL and an uppermost MoW layer of the first source electrode ST1 which functions as a buffer layer may be omitted. Here, to take the fact that the first source electrode ST1 is allowed to function as the reflector into consideration, it is preferable to eliminate the uppermost MoW layer of the first source electrode ST1 to expose the Al layer for enhancing the reflectance.

Figure 11:
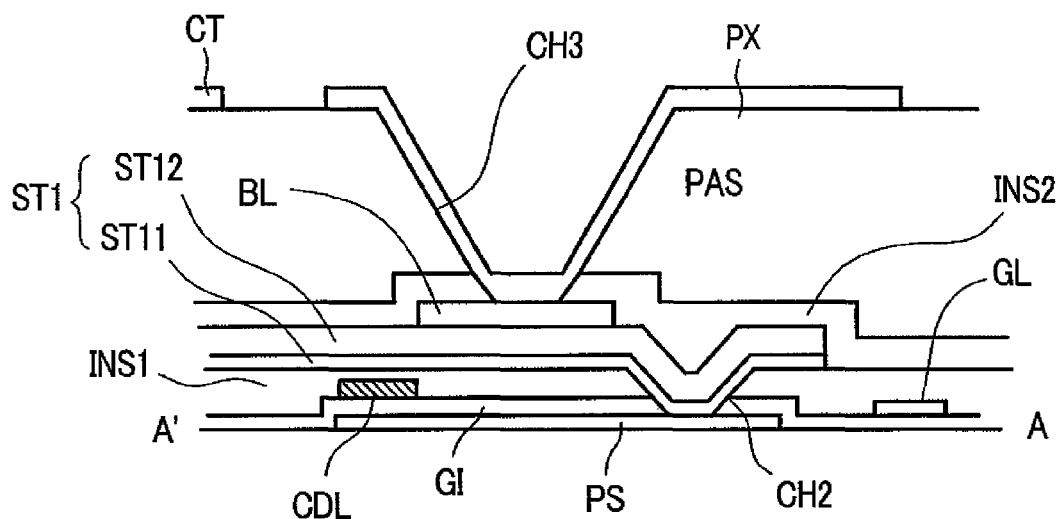
FIG. 11 is a cross-sectional view showing another embodiment in which a modification of the constitution shown in FIG. 10 is described.

FIG. 11 is a cross-sectional view showing another embodiment which is a partial modification of the above-mentioned constitution and corresponds to FIG. 10.

The constitution which makes this embodiment different from the embodiment shown in FIG. 10 lies in that a first source electrode ST1 which also functions as a reflector is constituted of a sequential stacked body formed of a MoW layer (indicated by symbol ST11 in the drawing) and an Al layer (indicated by symbol ST12 in the drawing), and an MoW layer which constitutes a buffer layer BL is selectively formed in a region of the sequential stacked body where the contact hole CH3 is formed and in the vicinity of the region. Due to such a constitution, the Al layer is exposed and hence, the reflectance of the first source electrode ST1 as the reflector is further enhanced.

Further, in the contact hole CH3, a pixel electrode PX which is connected with the first source electrode ST1 is formed of an ITO layer having a single layer.

Figure 12:
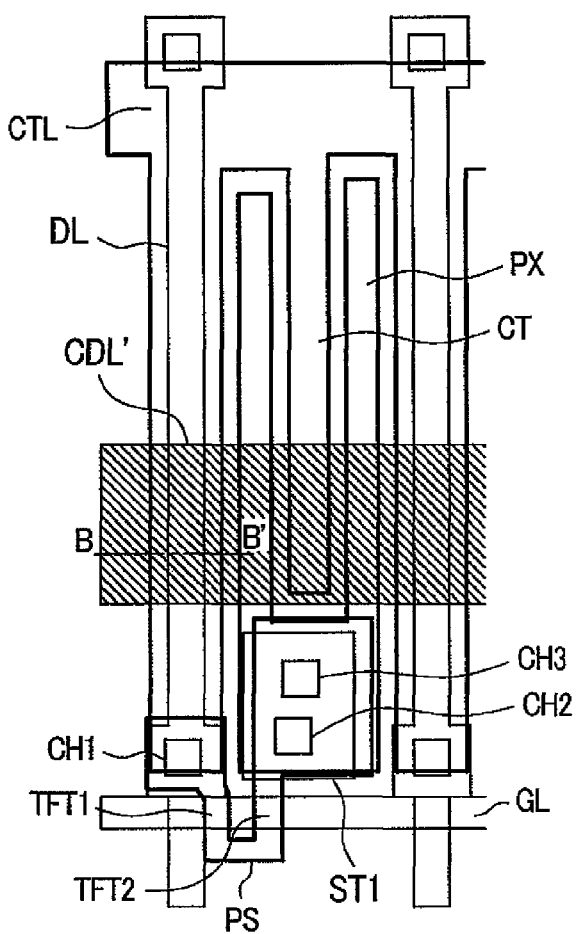
FIG. 12 is a plan view showing the constitution of a comparison example for explaining an advantageous effect of the constitution shown in FIG. 9.
Figure 13:
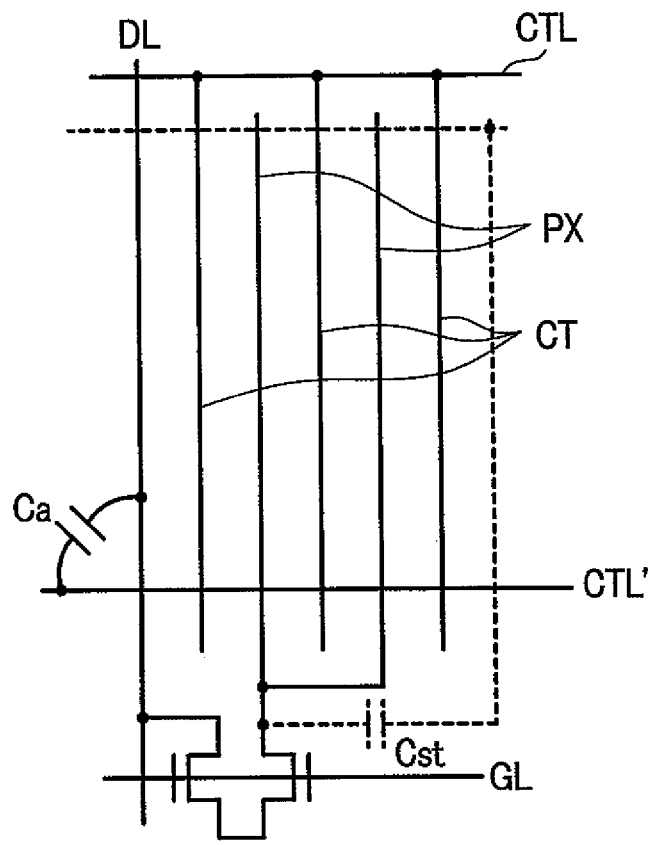
FIG. 13 is an equivalent circuit diagram showing a parasitic capacitance generated in the constitution shown in FIG. 12.
Figure 14:
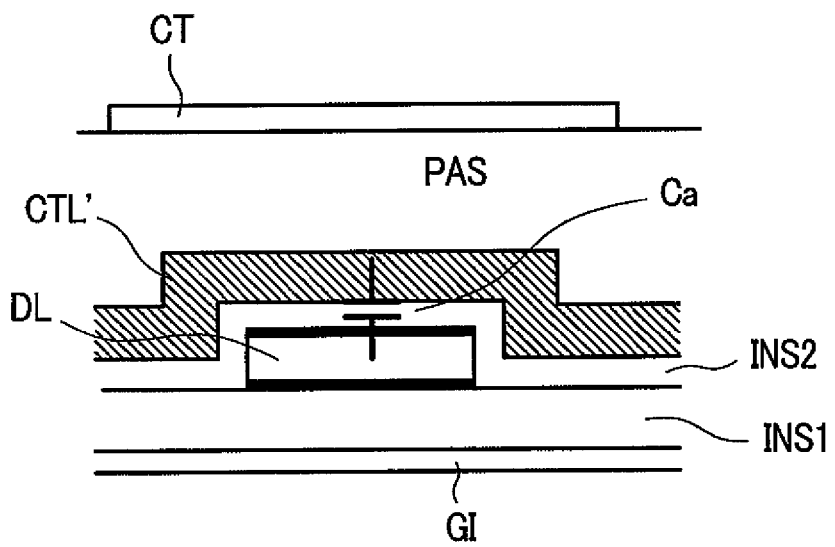
FIG. 14 is a cross-sectional view showing a parasitic capacitance generated in the constitution shown in FIG. 12.

Next, advantageous effects of the embodiments explained in conjunction with FIG. 9 to FIG. 11 are explained in comparison with comparison examples shown in FIG. 12 to FIG. 14.

In the embodiments explained in conjunction with FIG. 9 to FIG. 11, the first source electrode ST1 of the thin film transistor TFT is extended and the first source electrode ST1 is allowed to ensure the large area so as to also function as the reflector in the reflection region. The reflector is formed independently for every pixel region. Further, since the first source electrode ST1 also functions as a source electrode, a video signal which is applied to the pixel electrode PX is also applied to the first source electrode ST1. Due to such a constitution, it is possible to realize the reflector which can reduce a parasitic capacitance between the first source electrode ST1 and the drain signal line DL or the gate signal line GL.

For example, with respect to variations of the reflector, as comparison examples, it may be possible to consider constitutions shown in FIG. 12 to FIG. 14 where a common signal line CTL' also functions as a reflector. Here, the common signal line CTL' is provided separately from the common signal line CTL and is formed of a metal layer or the like which exhibits the high reflectance.

FIG. 12 is a plan view which shows the constitution of the pixel provided with the common signal line CTL' which also functions as a reflector. The common signal line CTL' is formed between a second interlayer insulation film INS2 and a protective film PAS and a line width thereof is set relatively large to allow the common signal line CTL' to be formed in a state that the common signal line CTL' occupies a reflection region.

Further, it is necessary to form the common signal line CTL' in common with the neighboring pixels and hence, it is necessary to form the common signal line CTL' in a state that the common signal line CTL' runs while intersecting the drain signal line DL or the gate signal line GL (In FIG. 12, the common signal line CTL' intersects the drain signal line DL).

Here, in the case shown in FIG. 12, there arises a drawback that a parasitic capacitance Ca which is generated between the common signal line CTL' and the drain signal line DL is increased to a level that the parasitic capacitance Ca cannot be ignored. The same goes for a case in which the common signal line CTL' is arranged to intersect the gate signal line GL.

FIG. 13 shows the parasitic capacitance Ca in an equivalent circuit of the constitution of the pixel shown in FIG. 12 and FIG. 14 shows the parasitic capacitance Ca which is generated between the drain signal line DL and the common signal line CTL' in a cross-sectional view taken along a line B-B' in FIG. 12.

Although a given potential (for example, a potential equal to a potential of the counter electrode CT) is applied to the common signal line CTL' which also functions as a reflector, when a potential of the drain signal line DL is changed to write a video signal into other pixel, the potential of the common signal line CTL' is also changed due to the influence from the parasitic capacitance Ca and hence, there arises a drawback that a display in a reflection region is changed correspondingly.

To the contrary, according to the present invention, the reflector does not intersect the drain signal line DL and the gate signal line GL and hence, it is possible to obtain an advantageous effect that the parasitic capacitance can be reduced.

Further, in the present invention, the reflector can be used in combination with the capacitance signal line CDL. In this case, the first source electrode ST1 may be constituted as one electrode of the capacitance Cst. However, since the combination of the reflector with the capacitance signal line CDL is an additional matter, the combined use of the capacitance signal line CDL and the reflector is arbitrary.

Here, the capacitance signal line CDL is applicable to the inventions described in the embodiment 1, the embodiment 3 and the embodiment 5 and the embodiments succeeding the embodiment 5. Since the capacitance signal line CDL is readily applicable to these embodiments by modifying the first embodiment by reference to FIG. 9 and the like, the illustration and the detailed explanation of such applications are omitted.

Embodiment 5

Figure 16:
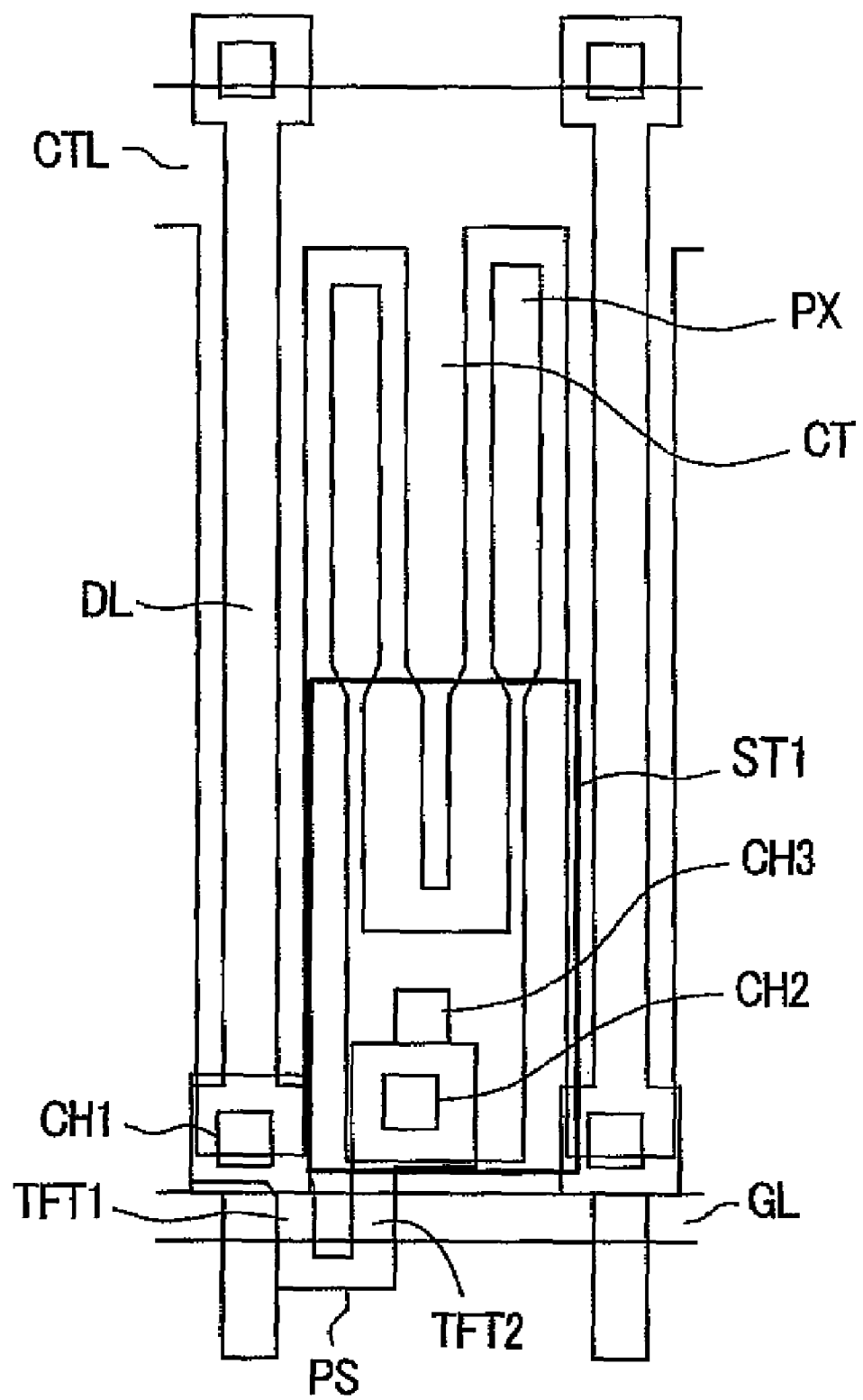
FIG. 16 is a plan view showing another embodiment of the constitution of the pixel of the liquid crystal display device according to the present invention.

FIG. 16 is a plan view of another embodiment of the constitution of the pixel of the liquid crystal display device according to the present invention and corresponds to FIG. 9. Here, the explanation is made hereinafter by focusing on only points which make this embodiment different from the embodiments described heretofore and the explanation of parts which are common with the parts of the embodiments described heretofore is omitted.

The constitution which makes this embodiment different compared with the embodiment shown in FIG. 9 lies in that a pixel electrode PX and a counter electrode CT in a reflection region have widths which are smaller than widths of the pixel electrode PX and the counter electrode CT in a transmission region.

Accordingly, a width of a gap between the pixel electrode PX and the counter electrode CT in the reflection region is set larger than a width of a gap between the pixel electrode PX and the counter electrode CT in the transmission region.

To be more specific, as viewed in a plan view, a gap between a linear portion of the counter electrode CT and a linear portion of the pixel electrode PX in the reflection region is larger than a gap between the linear portion of the counter electrode CT and the linear portion of the pixel electrode PX in the transmission region.

To realize such a constitution, as viewed in a plan view, with respect to at least one of the linear portion of the counter electrode CT and the linear portion of the pixel electrode PX (both linear portions in the case shown in FIG. 16), the width of the linear portion in the reflection region is set smaller than the width of the linear portion in the transmission region.

Here, although FIG. 16 shows the constitution which is not provided with the capacitance signal line CDL, the capacitance signal line CDL may be provided.

Figure 17A:
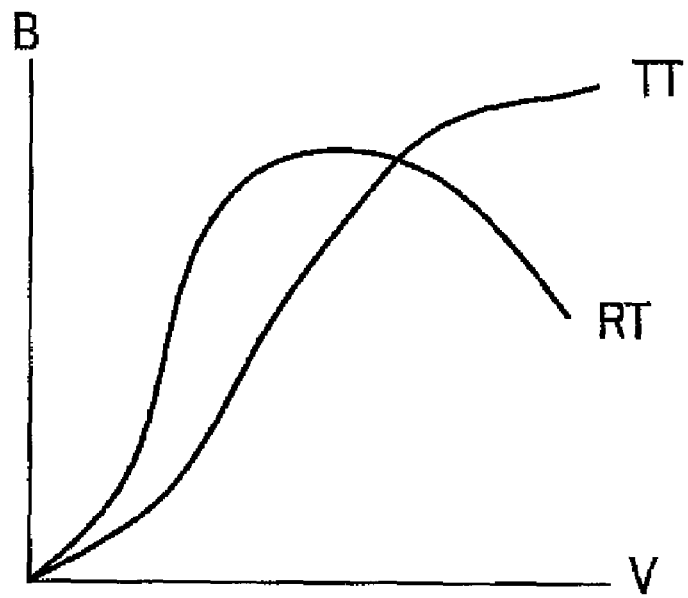

FIG. 17A shows characteristics of a potential difference (V) between the counter electrode CT and the pixel electrode and the brightness (B) of the pixel attributed to the potential difference in a state that widths of the counter electrode CT and the pixel electrode PX are set equal in the respective transmission reflection regions thus setting a spaced-apart distance between the counter electrode CT and the pixel electrode PX equal in the respective transmission and reflection regions.

As can be readily understood from FIG. 17A, the B-V characteristic of the transmission region and the B-V characteristic of the reflection region differ largely from each other, wherein the transmission region exhibits the characteristic in which the brightness is increased corresponding to the elevation of the potential difference, while the reflection region exhibits the characteristic that the brightness is increased with the small potential difference and, thereafter, the brightness is lowered when the potential difference is elevated.

Figure 17B:
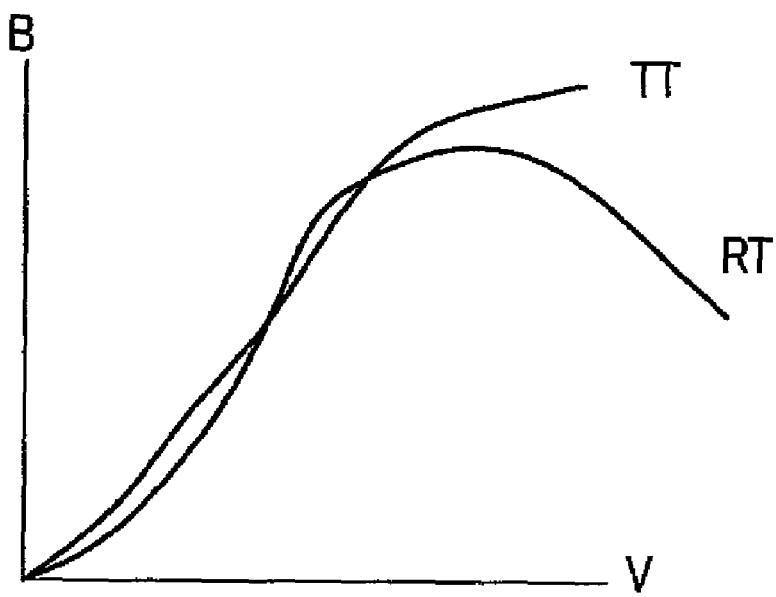

To the contrary, as shown in FIG. 16, FIG. 17B shows the characteristics of the potential difference (V) between the counter electrode CT and the pixel electrode PX and the brightness (B) of the pixel attributed to the potential difference in a state that the spaced-apart distance between the counter electrode CT and the pixel electrode PX in the reflection region is set larger than the corresponding spaced-apart distance in the transmission region. In FIG. 17B, in the same manner as the case shown in FIG. 17A, in the B-V characteristic (RT) in the reflection region, there exists a range where the brightness is lowered when the potential difference is largely elevated. However, the B-V characteristic (RT) in the reflection region substantially equally follows the B-V characteristic (TT) in the transmission region until the potential difference is largely elevated. Accordingly, it is understood that the respective B-V characteristics can be set substantially equal within a relatively large range of the change of the potential difference and hence, the characteristics are improved.

In this manner, by increasing the width of the gap between the electrodes in the reflection region so as to weaken the electric field of the reflection region than the electric field in the transmission region, it is possible to stretch the B-V characteristic in the reflection region in the V direction thus realizing the substantial alignment of the B-V characteristics of both regions.

Accordingly, by adopting the constitution shown in FIG. 16, it is possible to obtain an advantageous effect that the difference in image quality can be reduced in both of the reflection mode and the transmission mode.

Here, such an advantageous effect on the improvement of image quality can be increased when a layer thickness of the liquid crystal in the transmission region and a layer thickness of the liquid crystal in the reflection region are set as close as possible to each other. To be more specific, assuming the layer thickness of the liquid crystal in the transmission region as dt and the layer thickness of the liquid crystal in the reflection region as dr, it is desirable that a relationship 0.75dt≦dr≦1.1dt is established. It is more desirable that a relationship 0.9dt≦dr≦1.1dt is established. However, the layer thicknesses of the liquid crystal in the transmission region and the reflection region are not required to strictly satisfy the above-mentioned relationships or ranges and the application of the present invention in ranges other than the above-mentioned ranges is not restricted.

Here, these numerical ranges have been explained with respect to the inventions on the gap between electrodes in the reflection region explained in this embodiment and hence, other inventions are not limited to these numerical ranges.

Further, the above-mentioned relationship between the layer thickness dt of the liquid crystal in the transmission region and the layer thickness dr of the liquid crystal in the reflection region implies that, when the spaced-apart distance between the counter electrode CT and the pixel electrode PX in the reflection region is set larger than the corresponding spaced-apart distance in the transmission region, it is unnecessary to provide the large difference in height with respect to the substrate between the transmission region and the reflection region in the layer structure which is formed on a liquid-crystal-side surface of each one of respective substrates with the liquid crystal sandwiched therebetween.

Conventionally, an attempt has been made to reduce the difference in the optical path length of the light between the transmission region and the reflection region due to the stepped portion of the layer structure. In this embodiment, it is possible to obtain an advantageous effect that surfaces which are brought into contact with the liquid crystal can be substantially leveled due to the reduction of the stepped portion. This advantageous effect also brings about an advantageous effect that the rubbing treatment can be reliably performed in the formation of orientation films, for example.

In view of the above, the above-mentioned relationship between the layer thickness dt of the liquid crystal in the transmission region and the layer thickness dr of the liquid crystal in the reflection region can be grasped as an advantageous effect which can be obtained by setting the spaced-apart distance between the counter electrode CT and the pixel electrode PX in the reflection region larger than the corresponding spaced-apart distance in the transmission region. Accordingly, it is not always necessary to grasp the above-mentioned relationship between the layer thickness dt of the liquid crystal in the transmission region and the layer thickness dr of the liquid crystal in the reflection region as the constitutional feature of the present invention.

Embodiment 6

Figure 18:
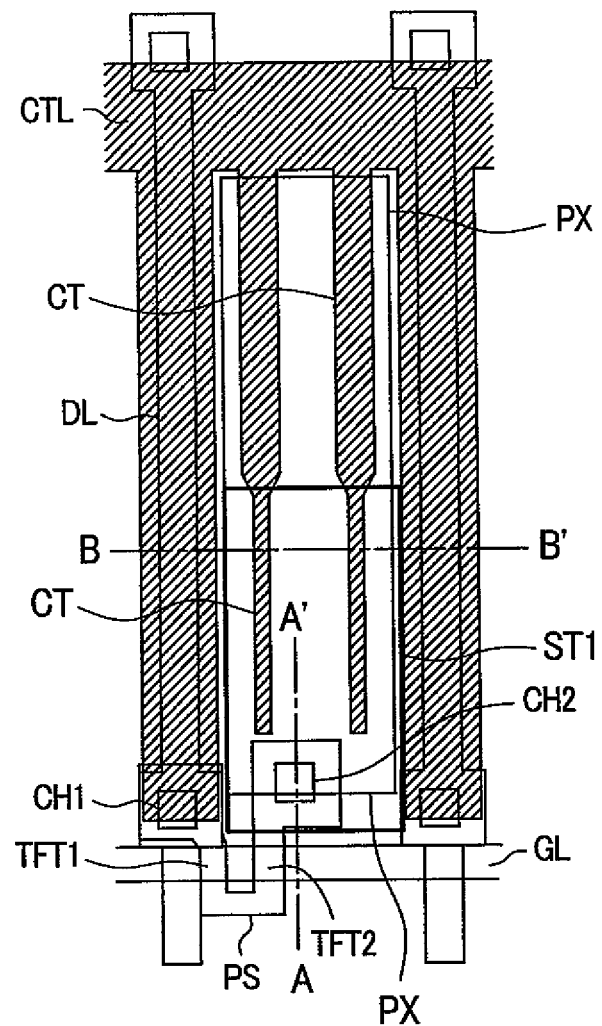
FIG. 18 is a plan view showing another embodiment of the constitution of the pixel of the liquid crystal display device according to the present invention.
Figure 19:
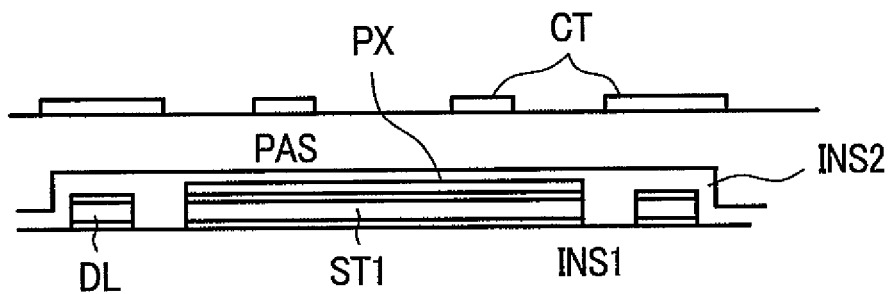
FIG. 19 is a cross-sectional view taken along a line B-B' in FIG. 18.
Figure 20:
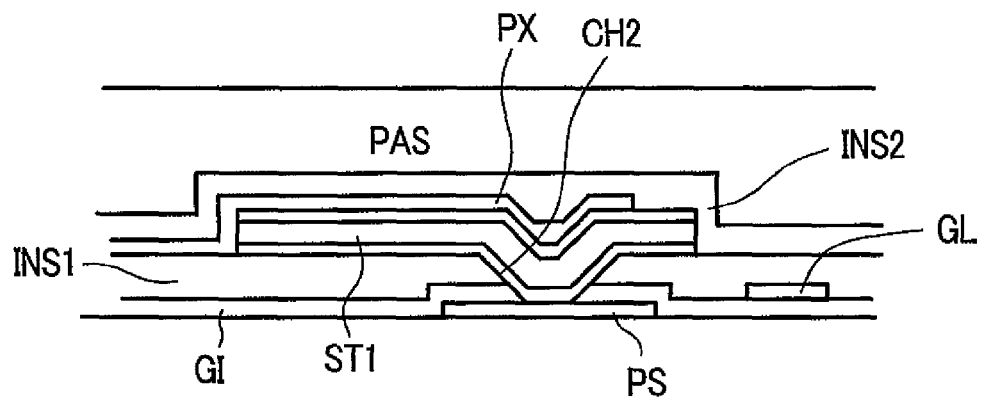
FIG. 20 is a cross-sectional view taken along a line A-A' in FIG. 18.

FIG. 18 is a plan view showing another embodiment of the constitution of the pixel when the width of the pixel electrode PX or the counter electrode CT is made different between the transmission region and the reflection region. Further, FIG. 19 is a cross-sectional view taken along a line B-B' in FIG. 18 and FIG. 20 is a cross-sectional view taken along a line A-A' in FIG. 19. Here, the explanation is made herein after by focusing on only points which make this embodiment different from the embodiments described heretofore and the explanation of parts which are common with the parts of the embodiments described heretofore is omitted.

On an upper surface of the first interlayer insulation film INS1, drain signal lines DL and first source electrodes ST1 of thin film transistors TFT2 are formed.

The drain signal lines DL and the first source electrodes ST1 are formed of a conductive film having the three-layered structure in which, for example, a MoW layer, an Al layer and a MoW layer are sequentially stacked. The first source electrode ST1 is connected with a poly-silicon layer PS or the pixel electrode PX and hence, it is necessary to form a buffer layer made of MoW or the like at least on a connection surface of the first source electrode ST1. Accordingly, it is possible to select an Ag layer as a buffer layer, for example, besides the MoW layer.

Here, the first source electrode ST1 is configured to function also as a reflector in the reflection region of the pixel.

Further, the pixel electrode PX made of ITO, for example, is formed at least on the transmission region of the pixel, and the pixel electrode PX is connected with the first source electrode ST1. Accordingly, the pixel electrode PX is formed on a whole area or on a portion of an upper surface of the first source electrodes ST1 in an overlapped manner, and the pixel electrode PX may be extended to the transmission region.

In this embodiment, the pixel electrode PX is formed above the first source electrode ST1. However, the embodiment is not limited to such a constitution and it is possible to obtain the substantially equal advantageous effect by forming the pixel electrode PX below the first source electrode ST1.

Further, the pixel electrode PX and the first source electrode ST1 may be overlapped to each other by way of an insulation film. In this case, it is possible to electrically connect the pixel electrode PX and the first source electrode ST1 by forming a contact hole or the like in the insulation film.

On an upper surface of the first interlayer insulation film INS1, a second interlayer insulation film INS2 (see FIG. 19, FIG. 20) is formed in a state that the second interlayer insulation film INS2 also covers the drain signal lines DL, the first source electrodes ST1 and the pixel electrodes PX. Further, on an upper surface of the second interlayer insulation film INS2, a protective film PAS (see FIG. 19, FIG. 20) is formed. The protective film PAS is, for example, formed of an organic material layer which is formed by coating.

On an upper surface of the protective film PAS, counter electrodes CT and common signal lines CTL which are connected with the counter electrodes CT are formed.

Here, the counter electrodes CT and the common signal lines CTL which are connected with the counter electrodes CT are formed of a light-transmitting conductive film (only a single layer in this embodiment) such as an ITO (Indium Tin Oxide) film.

The counter electrode CT is constituted of a plurality of electrodes which are extended along the direction of the drain signal lines DL, for example. Among these electrodes, the electrodes which are positioned in the reflection region have a smaller electrode width compared to an electrode width of the electrodes which are positioned in the transmission region as mentioned above.

This embodiment is also directed to a kind of lateral electric field type liquid crystal display device which generates an electric field between the pixel electrode PX and the counter electrode CT so as to drive the liquid crystal.

In this embodiment, one electrode has linear portions and another electrode has a planar portion, wherein at least portions of both electrodes are overlapped to each other by way of the insulation film.

Embodiment 7

Figure 21:
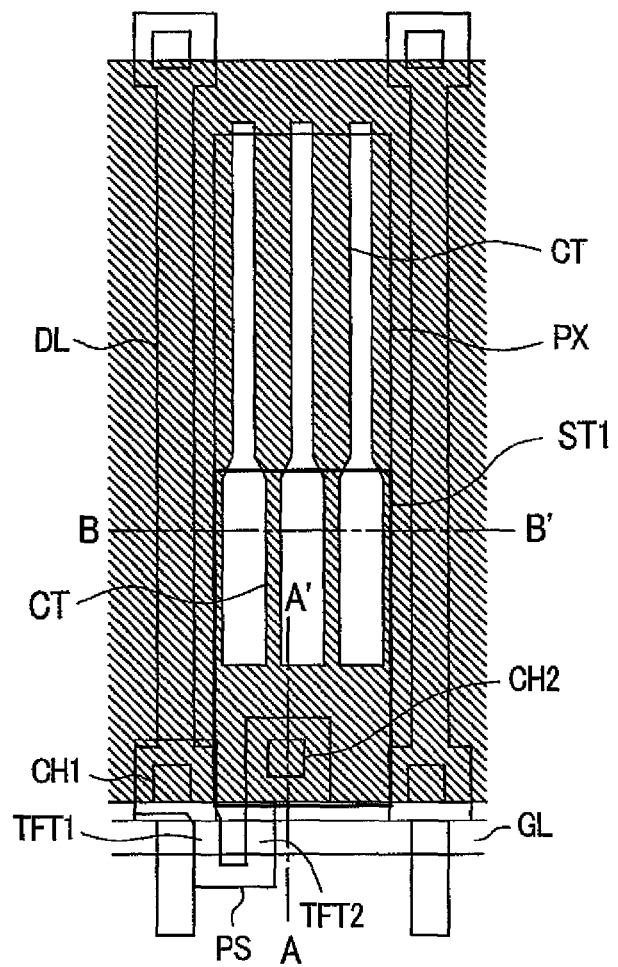
FIG. 21 is a plan view showing another embodiment of the constitution of the pixel of the liquid crystal display device according to the present invention.
Figure 22:
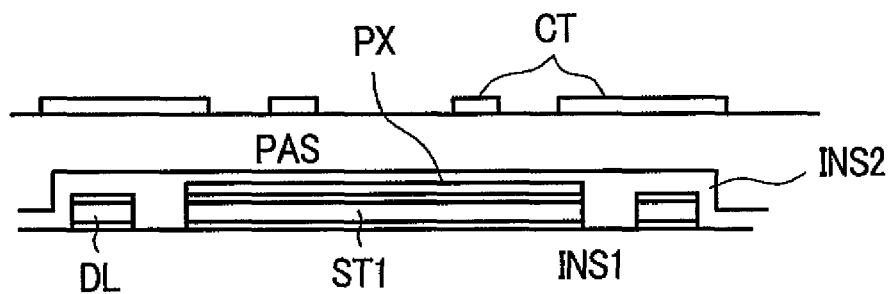
FIG. 22 is a cross-sectional view taken along a line B-B' in FIG. 21.

FIG. 21 is a plan view showing another embodiment which modifies the constitution shown in FIG. 18. The constitution which makes this embodiment different from the embodiment shown in FIG. 18 lies in counter electrodes CT. FIG. 22 is a cross-sectional view taken along a line B-B' in FIG. 21.

While the counter electrode CT shown in FIG. 18 has a comb-teeth-shaped pattern which uses a common signal line CTL as a proximal portion, the counter electrode CT of this embodiment adopts a pattern in which distal end portions of the comb teeth are connected in common. In other words, a portion of the counter electrode CT is formed in a pattern which has slit-like openings (slits). Here, a portion which is sandwiched by two slits is considered as a kind of linear portion.

Accordingly, even a portion of the contact hole CH2 is covered with a conductive layer made of a material equal to a material of the counter electrode CT. However, it is not always necessary to cover the contact hole CH2 with the conductive layer.

Here, the embodiments 6, 7 are also modifications of the embodiment 4. This is because that the first source electrode ST1 also functions as a reflector. Further, in the embodiments 6, 7, the pixel electrode PX and the reflector are formed below the counter electrode CT and, at the same time, at least a portion thereof are overlapped to the counter electrode CT by way of an insulation film (a protective film PAS or the like). The reflector also functions as a source electrode and hence, the reflector is independently formed for every pixel region and a signal equal to a signal applied to the pixel electrode PX is applied to the reflector. Accordingly, the reflector also plays a role of the pixel electrode PX. Further, the liquid crystal is driven by an electric field generated between the pixel electrode PX which also functions as the reflector and the counter electrode CT.

Embodiment 8

Figure 23:
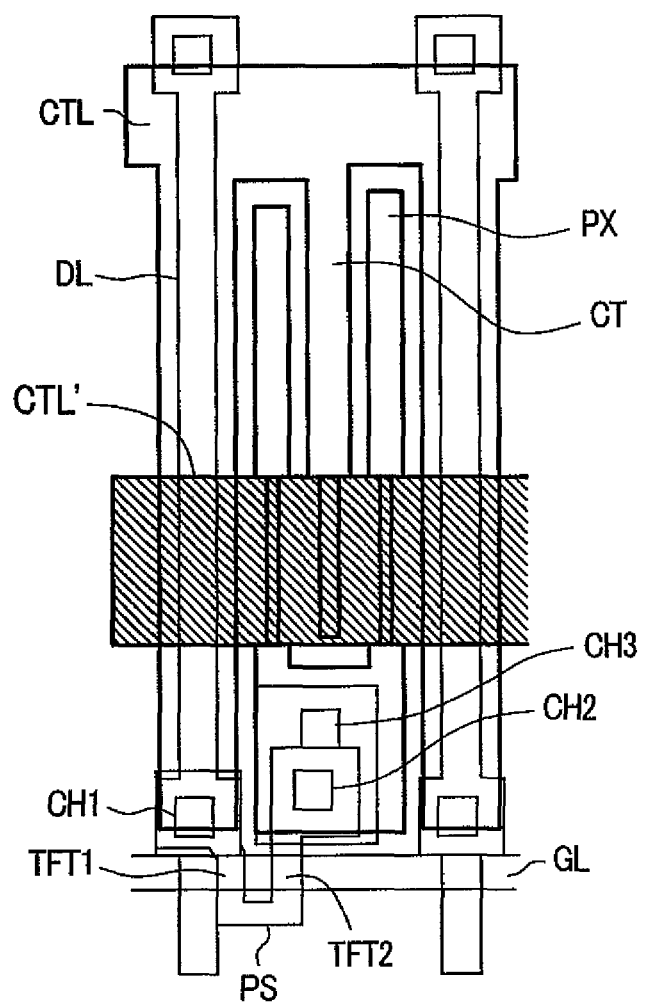
FIG. 23 is a plan view showing another embodiment of the constitution of the pixel of the liquid crystal display device according to the present invention.

FIG. 23 is a plan view showing another embodiment in which the present invention is applied to the above-mentioned constitution shown in FIG. 12.

To allow the common signal line CTL' formed of a reflecting conductive layer to function as a reflector, the common signal line CTL' is formed as a reflection region at a portion where the common signal line CTL' in the pixel region runs.

Further, the respective widths of the pixel electrode PX and the counter electrode CT which are arranged in the inside of the reflection region are set narrower than the respective widths of the pixel electrode PX and the counter electrode CT which are arranged in the inside of the transmission region.

Embodiment 9

Figure 24:
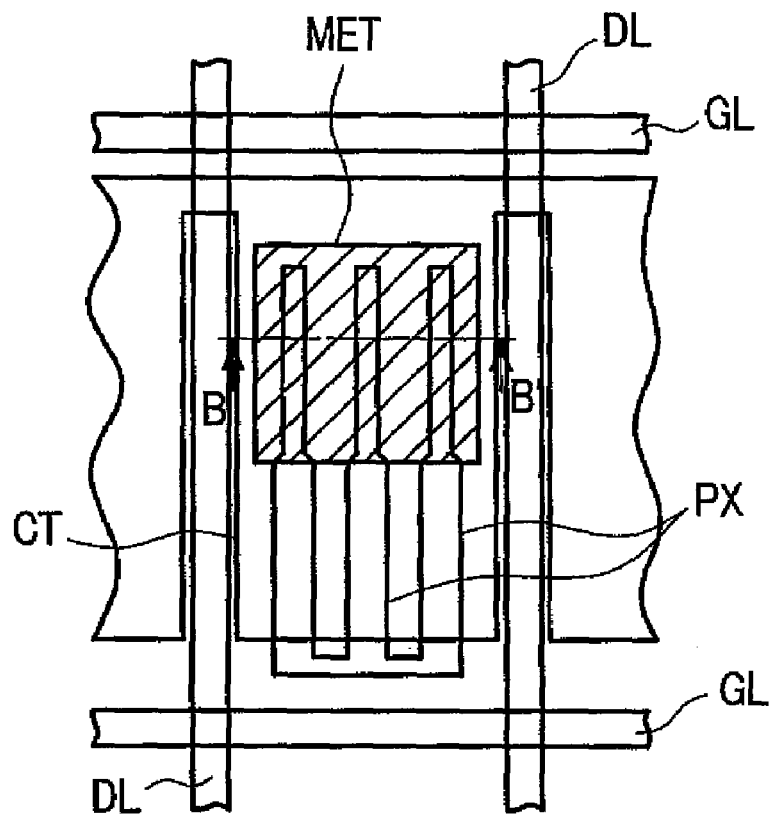
FIG. 24 is a plan view showing another embodiment of the constitution of the pixel of the liquid crystal display device according to the present invention.
Figure 25:
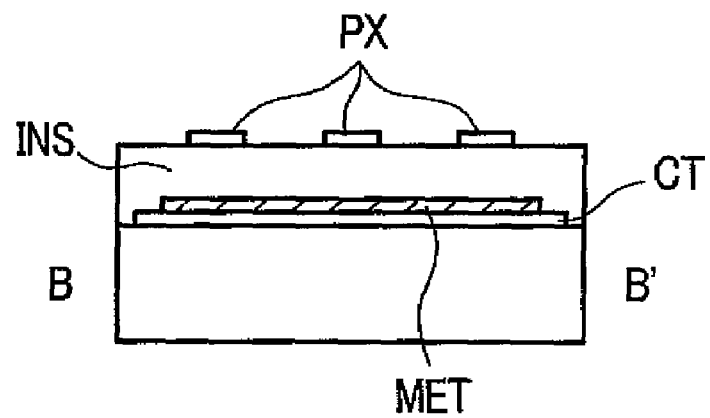
FIG. 25 is a cross-sectional view taken along a line B-B' in FIG. 24.

FIG. 24 is a plan view showing another embodiment which modifies the constitution shown in FIG. 18. The constitution which makes this embodiment different from the embodiment shown in FIG. 18 lies in that the constitutions of the counter electrode CT and the pixel electrode PX are reversed. FIG. 25 is a cross-sectional view taken along a line B-B' in FIG. 24.

In this embodiment, the counter electrode CT is formed of an electrode having a planar portion and the pixel electrode PX is formed of an electrode having linear portions and both electrodes have at least portions thereof overlapped to each other by way of an insulation film INS.

This embodiment is also directed to a kind of lateral electric field type liquid crystal display device which generates an electric field between the pixel electrode PX and the counter electrode CT so as to drive the liquid crystal.

A reflector MET is formed on a portion of the pixel region and the reflector MET is connected with the counter electrode CT.

In this embodiment, a gap between the pixel electrodes PX in the reflection region is set larger than a gap between the pixel electrodes PX in the transmission region. Further, a width of the pixel electrode PX in the reflection region is set smaller than the width of the pixel electrode PX in the transmission region.

Here, in FIG. 24, thin film transistors TFT1, TFT2 which are driven by a gate signal line GL, a first source electrode ST1 which is provided for supplying a video signal from the drain signal line DL to the pixel electrode PX by way of the thin film transistors TFT1, TFT2, a contact hole CH2 (or a contact hole CH3) which is necessary for connecting the first source electrodes ST1 and the pixel electrode PX and the like are omitted from the drawing. However, it is needless to say that the liquid crystal display device is provided with these parts in a suitably modified manner as explained in the above-mentioned respective embodiments. This is because that, in the inside of the pixel, the constitutional feature of this embodiment lies in a constitutional portion shown in FIG. 24 and the constitution of the whole pixel can be readily understood by explaining the portion mainly.

Embodiment 10

The counter electrode CT shown in FIG. 18 and FIG. 21 or the pixel electrode PX shown in FIG. 24 can be also constituted by sequentially stacking the reflecting conductive layer and the light-transmitting layer as explained in conjunction with the embodiment 1. Here, to focus on only the advantageous effects of the embodiment 1, it is arbitrary to adopt the invention on the electrode gap explained in conjunction with FIG. 5.

The above-mentioned respective embodiments may be used in a single form or in combination. This is because that the advantageous effects of the respective embodiments can be achieved independently or synergistically.

What is claimed is:
1. A liquid crystal display device comprising:
a first substrate;
a second substrate; and
liquid crystal sandwiched between the first substrate and the second substrate, wherein
the first substrate includes a first electrode having at least one linear portion and a second electrode having at least one linear portion in the inside of a pixel region, as viewed in a plan view, the linear portion of the first electrode and the linear portion of the second electrode are alternately arranged in the inside of the pixel region, the liquid crystal is driven by an electric field generated between the first electrode and the second electrode, the pixel region includes a transmission region which performs a display by allowing light from a back surface side to pass therethrough and a reflection region which performs a display by reflecting light from a front surface side, and as viewed in a plan view, a gap between the linear portion of the first electrode and the linear portion of the second electrode in the reflection region is larger than a gap between the linear portion of the first electrode and the linear portion of the second electrode in the transmission region.

2. A liquid crystal display device comprising:
a first substrate;
a second substrate; and
liquid crystal sandwiched between the first substrate and the second substrate, wherein
the first substrate includes a first electrode having at least one linear portion and a second electrode having at least one linear portion in the inside of a pixel region,
as viewed in a plan view, the linear portion of the first electrode and the linear portion of the second electrode are alternately arranged in the inside of the pixel region, the liquid crystal is driven by an electric field generated between the first electrode and the second electrode, the pixel region includes a transmission region which performs a display by allowing light from a back surface side to pass therethrough and a reflection region which performs a display by reflecting light from a front surface side, and assuming a layer thickness of the liquid crystal in the transmission region as dt and a layer thickness of the liquid crystal in the reflection region as dr, a relationship $0.75dt \leqq dr \leqq 1.1dt$ is established, and as viewed in a plan view, a gap between the linear portion of the first electrode and the linear portion of the second electrode in the reflection region is larger than a gap between the linear portion of the first electrode and the linear portion of the second electrode in the transmission region.

3. A liquid crystal display device according to claim 1, wherein as viewed in a plan view, with respect to at least either one of the linear portion of the first electrode and the linear portion of the second electrode, a width of the linear portion in the reflection region is smaller than a width of the linear portion in the transmission region.

* * * * *